United States Patent

Newman et al.

[11] Patent Number: 6,154,600
[45] Date of Patent: Nov. 28, 2000

[54] MEDIA EDITOR FOR NON-LINEAR EDITING SYSTEM

[75] Inventors: David Anthony Newman, San Diego; Robert Lee Wallin, Carlsbad, both of Calif.

[73] Assignee: Applied Magic, Inc., Carlsbad, Calif.

[21] Appl. No.: 08/906,304

[22] Filed: Aug. 5, 1997

Related U.S. Application Data

[60] Provisional application No. 60/023,359, Aug. 6, 1996.

[51] Int. Cl.[7] .............................. H04N 5/93; H04N 7/32
[52] U.S. Cl. ................................. 386/4; 386/52; 386/54; 386/55; 348/552; 348/722
[58] Field of Search ............................. 348/10, 552, 578, 348/589, 715, 716, 722, 700, 97; 455/6.2, 6.3; 345/150; 707/501; 382/232; 386/1, 4, 52, 131, 1.2, 54, 55; H04N 5/93, 7/32

[56] References Cited

U.S. PATENT DOCUMENTS

| | | | |
|---|---|---|---|
| 4,974,178 | 11/1990 | Izeki et al. | 364/523 |
| 5,206,929 | 4/1993 | Langford et al. | 395/159 |
| 5,218,672 | 6/1993 | Morgan et al. | 395/162 |

(List continued on next page.)

FOREIGN PATENT DOCUMENTS

| | | | |
|---|---|---|---|
| 0 560 624 A2 | 9/1993 | European Pat. Off. | H04N 5/262 |
| 0 564 247 A1 | 10/1993 | European Pat. Off. | G11B 27/031 |
| 0 662 688 A1 | 7/1995 | European Pat. Off. | G11B 27/031 |
| 0 715 459 A2 | 6/1996 | European Pat. Off. | H04N 5/76 |
| 0 737 978 A2 | 10/1996 | European Pat. Off. | G11B 27/031 |
| 2 273 220 | 6/1994 | United Kingdom | G11B 27/028 |
| WO 92/07359 | 4/1992 | WIPO | G11B 20/00 |
| WO 93/08664 | 4/1993 | WIPO | H04N 5/78 |
| WO 94/03897 | 2/1994 | WIPO | G11B 27/028 |

OTHER PUBLICATIONS

Dages, C, Broadcast Sessions, 18th International Television Symposium and Technical Exhibition, Montreux, pp. 655–664, Jun. 10, 1993, "Nonlinear Editing a Partnering of Technology and Creativity."

(List continued on next page.)

*Primary Examiner*—Mark R. Powell
*Assistant Examiner*—Wesner Sajous
*Attorney, Agent, or Firm*—Knobbe, Martens, Olson & Bear, LLP

[57] ABSTRACT

A non-linear editing system for home audio and video applications includes a compression/decompression engine, a high capacity storage device and a media editor that provides point and click audio and video editing functionality, including recording, playback and special effects, such as real time gamma correction, color effects, 2D effects and real time fades, using a time-line system. The media editor includes a configurable Shaped Cut, Relocate, Alpha and Mixer (SCRAM) engine to mix, shape cut and relocate portions of images. In addition, the SCRAM engine supports pixel weighting to enable drawing and movement of transparent objects for video overlay operations. The compression/decompression engine includes electronic circuitry designed to implement high speed data compression and decompression using JPEG, MPEG or wavelet techniques. The high capacity storage device typically comprises internal and external non-linear magnetic storage devices, such as Enhanced IDE or SCSI hard drives, although other non-linear storage devices, such as magneto-optical or optical disk drives may be used. Similarly, the system includes input/output (I/O) capability for video in composite NTSC or PAL formats including SVHS resolutions, analog and digital stereo audio in 16-bit CD format, multimedia inputs, such as clip art and synchronized audio/video, from CD-ROMs and DVDs, a Musical Instrument Digital Interface (MIDI) and Internet connectivity through standard telephone lines using a modem and through cable TV lines. The system does not require the use of a computing device, such as a personal computer, to perform its non-linear editing functions.

16 Claims, 15 Drawing Sheets

U.S. PATENT DOCUMENTS

| | | | |
|---|---|---|---|
| 5,267,351 | 11/1993 | Reber et al. | 395/600 |
| 5,355,450 | 10/1994 | Garmon et al. | 395/162 |
| 5,359,712 | 10/1994 | Cohen et al. | 395/161 |
| 5,388,197 | 2/1995 | Rayner | 395/154 |
| 5,412,479 | 5/1995 | Alig | 348/594 |
| 5,438,423 | 8/1995 | Lynch et al. | 358/335 |
| 5,465,120 | 11/1995 | Schultheiss | 348/716 |
| 5,467,288 | 11/1995 | Fasciano et al. | 364/514 R |
| 5,508,940 | 4/1996 | Rossmere et al. | 364/514 A |
| 5,515,490 | 5/1996 | Buchanan | 395/154 |
| 5,537,157 | 7/1996 | Washino et al. | 348/722 |
| 5,539,527 | 7/1996 | Kajimoto et al. | 358/335 |
| 5,559,562 | 9/1996 | Ferster | 348/584 |
| 5,563,866 | 10/1996 | Taguchi et al. | 396/83 |
| 5,577,190 | 11/1996 | Peters | 395/501 |
| 5,584,006 | 12/1996 | Reber et al. | 395/427 |
| 5,598,514 | 1/1997 | Purcell et al. | 395/118 |
| 5,608,656 | 3/1997 | Purcell et al. | 364/514 R |
| 5,682,330 | 10/1997 | Seaman | 364/551.01 |
| 5,726,717 | 3/1998 | Peters | 348/593 |
| 5,771,380 | 6/1998 | Tanaka | 395/615 |
| 5,913,008 | 6/1999 | Itou | 348/552 |
| 5,930,445 | 7/1999 | Peters | 348/97 |
| 6,025,886 | 2/2000 | Koda | 348/700 |
| 6,041,142 | 3/2000 | Rao | 382/232 |

OTHER PUBLICATIONS

Fronczak, D. and Seltz, D., Preceedings of WESCON '95, San Francisco, CA, USA, Nov. 7, 1995, "Motion JPEG and MPEG Solutions for Multimedia".

Miller, G., et al., ACM International Conference on Multimedia, pp. 383–392, Aug. 1993, "News On–Demand for Multimedia Networks".

Roth, T.S., International Broadcasting Convention, Amsterdam, pp. 23–25, Sep. 12, 1996, "The Transition to an Integrated Digital Broadcast Environment".

Rouse, N., et al., International Broadcasting Convention, Amsterdam, pp. 32–34, Sep. 12, 1996, "FARAD—A Storage System for Random Real–Time Data".

FRONT SIDE VIEW

TOP VIEW

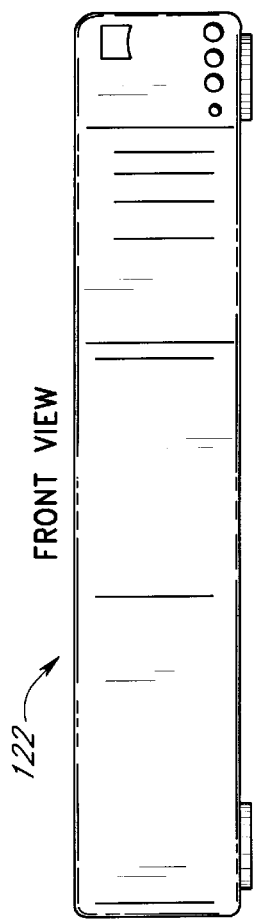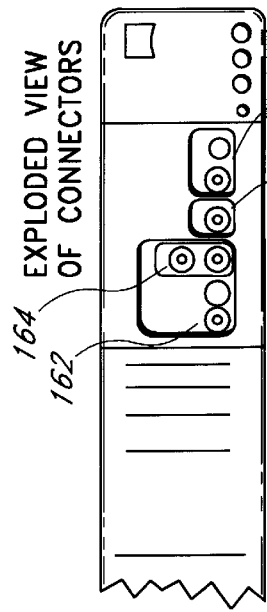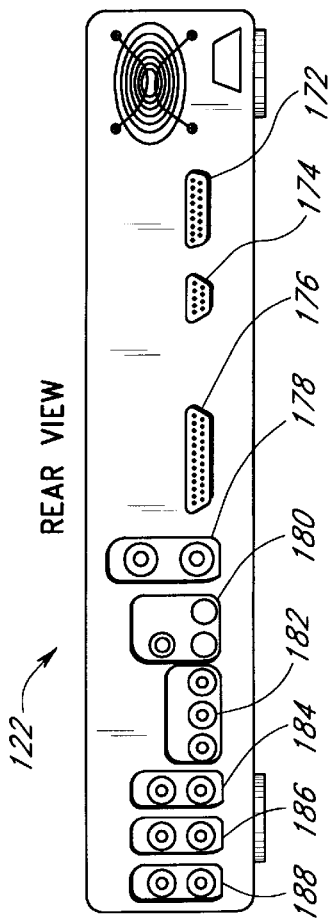

MEDIA EDITOR FOR NON-LINEAR EDITING SYSTEM

RELATED APPLICATIONS

This application claims the benefit of the filing date of U.S. provisional patent application Serial No. 60/023,359, filed Aug. 6, 1996, for "NON-LINEAR AUDIO/VIDEO EDITING SYSTEM FOR HOME ENTERTAINMENT ENVIRONMENTS" to Robert Lee Wallin. In addition, this application is related to patent application Serial No. 08/906,589, entitled "NON-LINEAR EDITING SYSTEM FOR HOME ENTERTAINMENT ENVIRONMENTS", assigned to Applied Magic, Inc., concurrently filed and hereby incorporated in this patent application by reference.

BACKGROUND OF THE INVENTION

1. Field of the Invention

The invention relates to non-linear editing systems and, more particularly, to a media editor for the storage, editing and retrieval of audio/visual information.

2. Description of the Related Technology

Linear video editing systems, such as those for videotape and photographic film, are old in the art. In contrast, current personal computer (PC) systems, such as those of the Apple® Macintosh® and Intel® architecture, offer non-linear video editing systems. Non-linear editing on computer oriented systems involves digitizing analog media data recorded from a linear source, such as videotape or film, and storing the digitized media data on a storage device, such as a magnetic disk drive. Once digitized, the non-linear editing system permits rapid access to media data at any point in the linear sequence for subsequent manipulation of media data portions into any order. For example, non-linear editing systems enable the combination of audio clips with other video clips and the formation of new clips using portions of other clips.

The non-linear video editing capability typically resides in a plug-in card for the NuBus or PCI expansion bus of a Macintosh architecture PC or the ISA, EISA or PCI expansion bus of an Intel architecture PC. These non-linear video editing systems typically use compression techniques developed by the Joint Photographic Experts Group (JPEG) or the Motion Picture Experts Group (MPEG). For example, in U.S. Pat. No. 5,577,190, Peters discloses a media editing system that receives, digitizes, stores and edits audio and video source material, using JPEG compression, for later manipulation by a computer, such as an Apple Macintosh. Similarly, in U.S. Pat. No. 5,508,940, Rossmere, et al., disclose a multimedia random access audio/video editing system including a main control unit that receives data and commands over a SCSI bus from a personal computer having an analog I/O board coupled to audio and video processing boards using JPEG compression. Moreover, Reber et al. disclose a system and method for the management of media data in a non-linear editing system that enables dynamic linking of digitized media data with a specific source reference at run time in U.S. Pat. No. 5,584,006. Lastly, in U.S. Pat. No. 5,438,423, Lynch, et al., disclose a system and method for continuously storing the video content of a program, using JPEG or MPEG compression, in a recirculating random access buffer having sufficient capacity to store a substantial portion of the program.

Unfortunately, consumers currently have no cost effective alternatives for enhancement of their camcorder movies and digital pictures without having to incur substantial costs to purchase a personal computer with a high resolution computer graphics monitor, associated add-in cards and software for non-linear editing. In addition, conventional non-linear editing systems are designed for expert users, such as a professional movie editor, to edit a large number of unrelated movie clips stored on the same linear film or videotape. Thus, conventional non-linear editing system tools are complex and require a high degree of manual interaction and configuration to produce a final edited result. In contrast, consumers often capture closely related events, such as vacations and birthday parties, on videotape using their camcorders. To edit these camcorder tapes, consumers require easy to use non-linear editing systems that facilitate editing without a high degree of computer or editing skill and time spent to configure plug-in cards and software. Similarly, manufacturers currently have no viable, cost effective means for incorporating non-linear editing functionality into their home entertainment components because currently available non-linear editing systems are specifically adapted for personal computer plug-in applications and functionality, instead of home entertainment components. Conventional non-linear editing systems, such as Adobe® Premiere®, provide user interfaces designed for rendering on high resolution non-interlaced computer graphics monitors. Although computer graphics monitors are viewed from a distance of one to two feet, consumers must often zoom-in on portions of the user interface to perform non-linear editing functions. In contrast, conventional television sets having low resolution interlaced displays, commonly available in home entertainment environments, render poor quality images of these user interfaces designed for high resolution graphics monitors. To compound matters, consumers often view their television sets from a distance of several feet, where a poor quality rendition of a user interface severely impedes its use. Consumers require a non-linear editing system adapted for use with conventional television sets.

Furthermore, current personal computer based non-linear editing systems are specifically adapted to an RGB (red, green and blue) color space used for non-interlaced computer graphics monitors or CRTs. However, RGB is a poor choice for representing real-world images because equal bandwidths are needed to describe each color component while the human eye is more sensitive to luminance (the Y or black and white component) than color components (the U and V components). The equal bandwidth of the RGB format provides the same pixel depth and display resolution for each of the three color components. For example, an NTSC video frame requires about 1012 kilobytes of RGB data, whereas only 675 kilobytes of YUV (4:2:2) data are needed for the same NTSC video frame. Television displays are adapted to receive 29.97 NTSC frames/sec. Thus, to receive an uncompressed NTSC video feed, a non-linear editing system requires a bandwidth of at least 30.3 megabytes/sec. To support the increased bandwidth requirements of the RGB format, non-linear editing systems require expensive dual port video RAMs, instead of low cost synchronous DRAMs. A reduction in the RGB bandwidth requirements needed for PC based nonlinear editing systems is needed to make a non-linear editing system affordable for home use.

In addition, some conventional PC systems use a block memory mover, such as the blitter of the Commodore AMIGA, to manipulate the pixels comprising a rectangular region of a computer display image without intervention of the microprocessor. A personal computer can display images on its display in a wide variety of resolutions, such as 640×480 pixels or 1280×1024 pixels. A plurality of RGB bits represents each pixel of a display image. Typically, the block memory mover has to copy the bits comprising the pixels of the rectangular region from one location of frame buffer memory to another location of frame buffer memory, implemented using expensive video RAM, to maintain standard computer display resolutions. Unfortunately, conventional block memory movers are designed only to move pixels within a controllable mask, which merely defines whether or not to move specific pixels of the displayed image. Thus, PC based non-linear editing systems do not use conventional block memory movers to perform non-linear editing functions, such as shaped cuts and mixing. Moreover, the use of a block memory mover to perform shaped cuts degrades the output video quality as the fine edges of a shaped cut appear very jagged without some form of anti-aliasing when displayed on a low resolution television set. To bring non-linear editing systems into the home, improved block memory movers capable of performing non-linear editing functions are needed.

Lastly, current PC based non-linear editing systems use conventional memory controllers to access frame buffer memory, which is implemented using expensive FIFOs or VRAMs in order to meet the bandwidth requirements for video data transfers. However, for the same storage capacity, a FIFO currently costs about 20 times more than a DRAM, while a VRAM currently costs about 5 times more than a DRAM. Unfortunately, conventional memory controllers can not support the bandwidth requirements for video data transfers by accessing DRAM memory. Thus, to provide cost effective, non-linear editing systems for home use, consumers require an improved memory controller capable of supporting video bandwidth requirements using DRAM memory. Moreover, conventional non-linear editing systems also increase system cost by using additional dedicated processors, such as audio DSPs or the CPU of the personal computer, for audio editing functions. In summary, consumers have a substantial unmet need for cost effective, non-linear editing systems for home audio and video applications that do not require the use or purchase of an expensive personal computer.

SUMMARY OF THE INVENTION

The present invention provides an economical solution for the incorporation and editing of hypermedia, such as motion pictures, music, animation and photographs, into a wide variety of present and future platforms. By eliminating the need for a costly personal computer, the present invention enables the incorporation of conventional home entertainment components, such as VCRs, camcorders and compact disc players, into an economical, stand-alone, non-linear hypermedia editing system. The present invention allows consumers to capture hypermedia from real-time on-line sources, such as broadcast radio and television, pay per view cable/satellite television services and the World Wide Web portion of the Internet, as well as off-line sources, such as video cassette tapes, laserdiscs, DVDs and compact discs. Analog hypermedia is digitized and may be compressed for storage. Consumers may replay the captured hypermedia in addition to selectively capturing and manipulating hypermedia portions, or clips, using the graphical user interface (GUI) of the present invention. Captured clips appear as icons on the GUI and consumers may combine captured clips by manipulating their respective icons to effect a wide variety of editing functions, such as fades, dissolves, wipes, and animated effects. Consumers may also use the point, click, drag and drop functionality of the GUI to integrate captured clips onto a timeline to form a motion picture clip. In a similar manner, consumers may edit and incorporate still photographs, audio, text and other data for incorporation into a clip.

The present invention includes a Shaped Cut, Relocate, Alpha and Mixer (SCRAM) engine, which can operate on display images in real-time to mix, shape cut and relocate portions of images in a range of configurable sizes down to a size of 4×1 pixels. In contrast to prior art block memory movers, the SCRAM engine of the present invention provides for the specification of a pixel weighting, which enables the drawing and movement of objects, having a selectable degree of transparency, for anti-aliasing of graphic objects and text during video overlay operations. In addition, the SCRAM engine provides for the movement of objects on a television set without the appearance of jagged edges, thereby overcoming substantial limitations of conventional block memory movers. Similarly, the SCRAM engine provides for the creation of transitions between hypermedia portions and may be used as a high speed drawing tool. Moreover, the SCRAM engine improves system performance, while reducing system cost, by executing complex pixel manipulation functions typically performed by a costly microprocessor of a PC based non-linear editing system. The present invention likewise includes an improved memory controller that provides for multiple sequential accesses to DRAM memory at video data rates. Lastly, the present invention provides for a wide variety of output mediums for the edited results, such as television sets, color printers, videotapes, DVDs, computer displays and audio speakers.

One aspect of the present invention includes a media editor for non-linear editing of hypermedia comprising a video controller to receive a video portion of a hypermedia input, an input frame controller, in communication with the video controller, to provide a plurality of video frames representing the video portion, a memory controller to receive the video frames from the input frame controller for storage in a memory, wherein the memory controller accesses the memory, and an editing engine, in communication with the memory controller, to receive and manipulate the video frames.

Another aspect of the present invention includes an editing engine for manipulating hypermedia comprising a first transition controller to retrieve a first frame from a memory controller, a second transition controller to retrieve a second frame from the memory controller, an alpha transition controller to retrieve an alpha frame from the memory controller, and a video ALU to receive and integrate the first frame, the second frame and the alpha frame so as to form a transition frame.

BRIEF DESCRIPTION OF THE DRAWINGS

FIG. 2b is a top plan view of the remote control shown in FIG. 2a.

FIG. 4a is a front side elevational view of an embodiment of a main unit of the present invention.

FIG. 4b is a cutaway front side elevational view of an embodiment of an open connector panel of the main unit of FIG. 4a.

FIG. 4c is a rear side elevational view of the main unit shown in FIG. 4a.

DETAILED DESCRIPTION OF THE PREFERRED EMBODIMENTS

The following detailed description of the presently preferred embodiments presents a description of certain specific embodiments to assist in understanding the claims. However, one may practice the present invention in a multitude of different embodiments as defined and covered by the claims.

For convenience, the description comprises four sections: the Non-Linear Editing System, the Media Editor, Operation of the Non-Linear Editing System and Summary. The first section describes the non-linear editing system of the present invention, the next section provides an overview of the media editor of the present invention, the following section describes the operation of the non-linear editing system and the remaining section summarizes advantageous features of the present invention.

The term hypermedia refers to the integration of text, graphics, sound, video, and other data, or any combination into a primarily associative system for information presentation, storage and retrieval. For example, hypermedia includes motion pictures, music, animation and photographs. Hypermedia environments enable users to make associations between topics. For example, a hypermedia presentation on navigation may include associations, or links, to such topics as astronomy, bird migration, geography, satellites and radar. Multimedia, the combination of sound, graphics, animation and video information, is related to hypermedia in that hypermedia combines the elements of multimedia with associations to link the information.

I. Non-Linear Editing System

Figure 1:
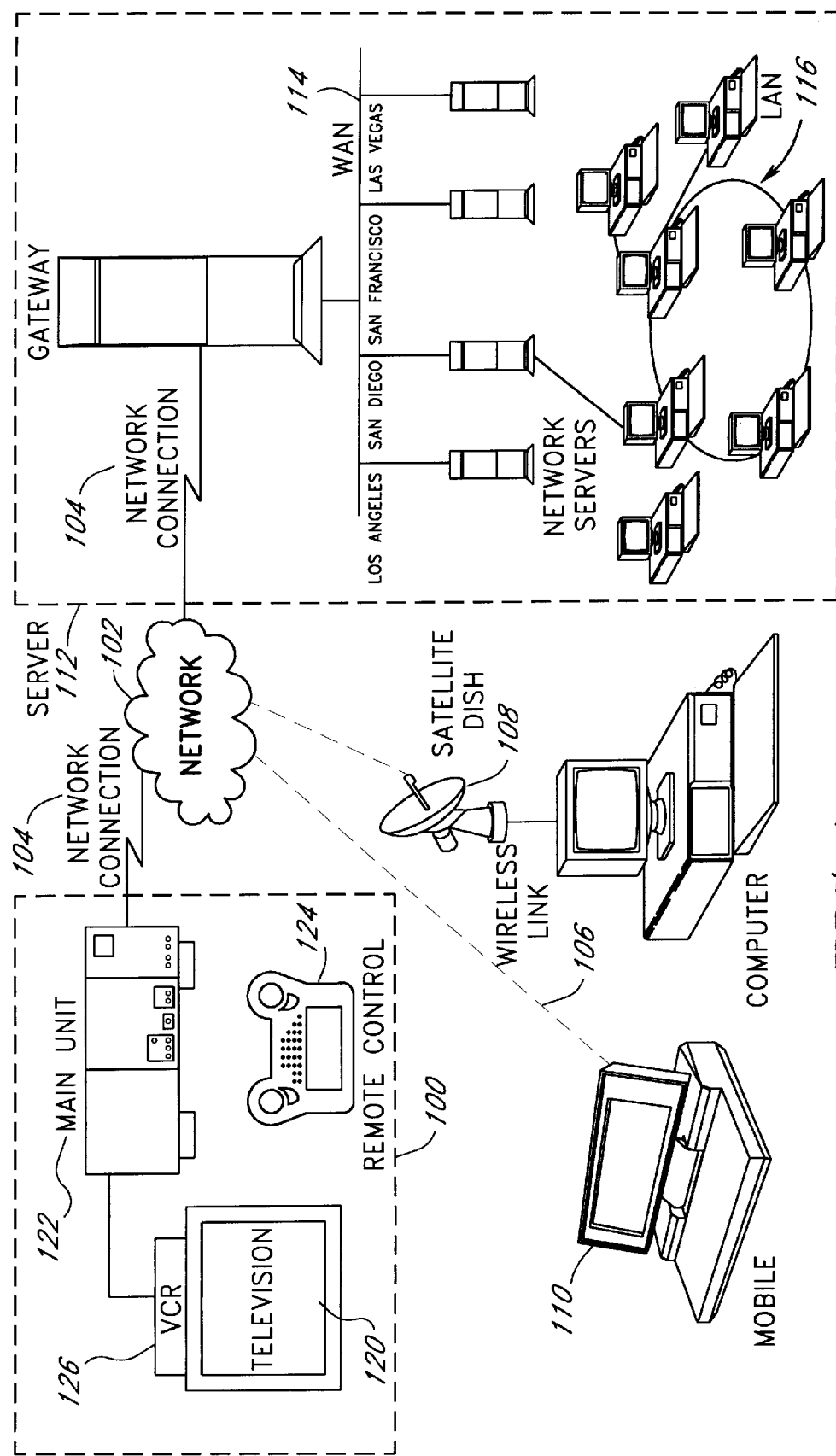
FIG. 1 is a block diagram illustrating an example of an environment for practicing the present invention.

FIG. 1 illustrates an environment for practicing the present invention. A non-linear editing system 100 of the present invention communicates with a network 102. Network devices may include computing devices, cable and satellite TV tuners, Web television sets, wireless phones and information kiosks, among others. Computing devices communicating with the network 102 may include clients, such as a network computer and a mobile computer 110, and servers 112, such as a wide area network 114 including a plurality of local area networks 116, each having associated computing devices. To obtain hypermedia, such as television programming and Internet data, network devices communicate with the network 102 using a network connection 104. Network connections 104 may include wired links, such as those connected to the public switched telephone network (PSTN) and a cable television provider, and wireless links 106, such as cellular phones, mobile computer cellular digital packet data (CDPD) modems and satellite dishes 108.

The non-linear editing system 100 includes an output device 120, such as a home television set, a main unit 122, in communication with the output device 120, providing the non-linear editing functions and a remote control 124. The non-linear editing system may also include hypermedia recording devices 126, such as a video cassette recorder (VCR), video camera, camcorder or digital video disk (DVD) recorder. The remote control 124 communicates all editing and playback functions to the main unit 122 for display on the output device 120 preferably using wireless techniques, such as infrared or radio waves. However, the remote control 124 may also communicate with the main unit 122 using a wired connection.

Figure 2A:
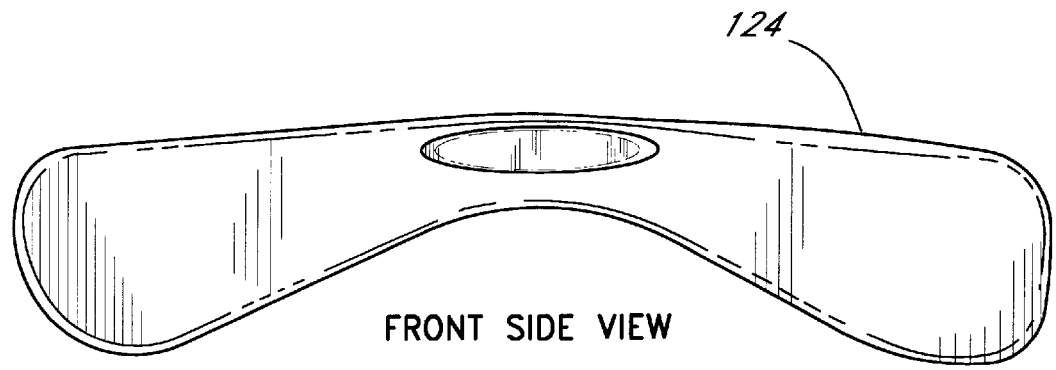
FIG. 2a is a front side elevational view of an embodiment of a remote control of the present invention.
Figure 2B:
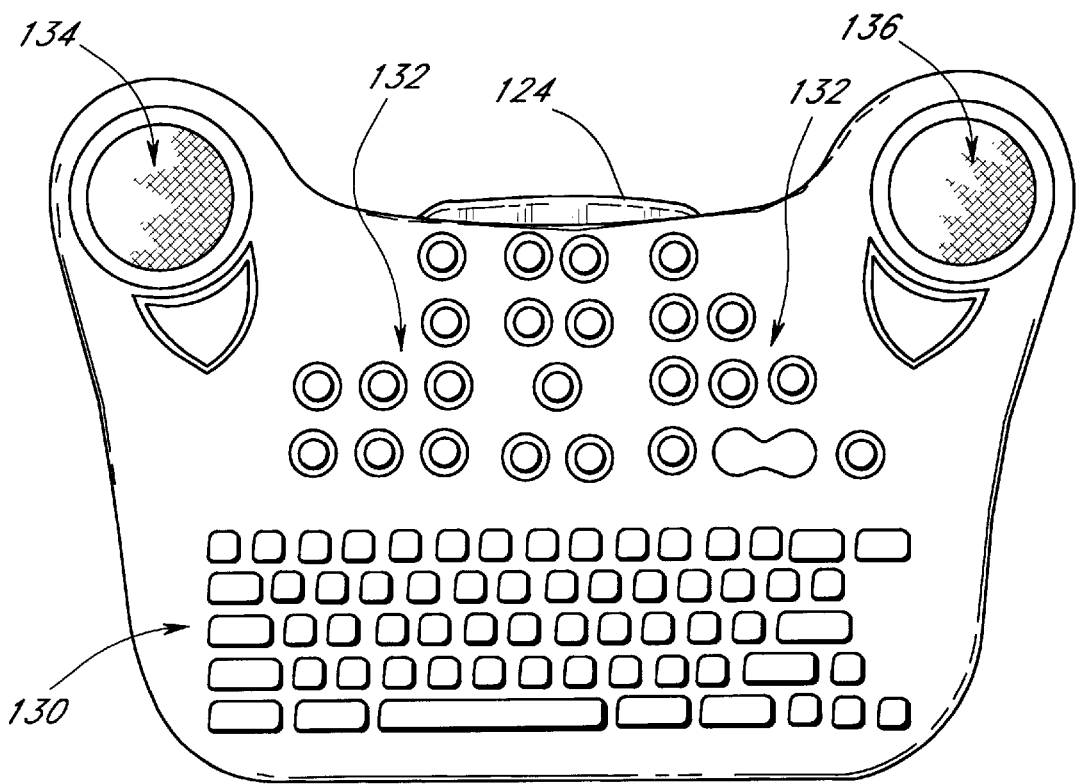

FIG. 2a illustrates a front side view of one presently preferred embodiment of the remote control 124. Referring now to the top view of FIG. 2b, the remote control 124 includes a keyboard 130 having a plurality of keys or buttons to communicate editing functions to the main unit 122 (FIG. 1). The keyboard 130 provides for generation of alphanumeric characters, such as those used in home video titles, flying text, logos or graphics. The remote control 124 may also provide special keys 132, such as cut, paste and help buttons, and a pointing device 134, such as a mouse, touch pad, track ball or light pen. The pointing device 134 provides for control of the on-screen cursor on the viewing device 120 (FIG. 1) to select, scroll or move along a selected path. Moreover, the remote control 124 may also include a jog/shuttle wheel 136 enabling rapid selection of an individual frame of a motion picture. In a preferred embodiment, the remote control 124 includes a configurable device capable of operating as a pointing device 134 and a jog/shuttle wheel 136. Using software, a user may configure the pressure sensitive buttons 134, 136 of the configurable devices to operate either as a pointing device or as a jog/shuttle wheel. When operating as a pointing device, the on-screen cursor acceleration is proportional to the pressure of user exertion on the button 134, 136. Advantageously, a configurable device enables proficient operation of the pointing device and the jog/shuttle wheel by both left handed and right handed users. Lastly, the remote control 124 may accept power from a portable power source, such as rechargeable and non-rechargeable batteries, as well as AC power from a wall socket.

Figure 3:
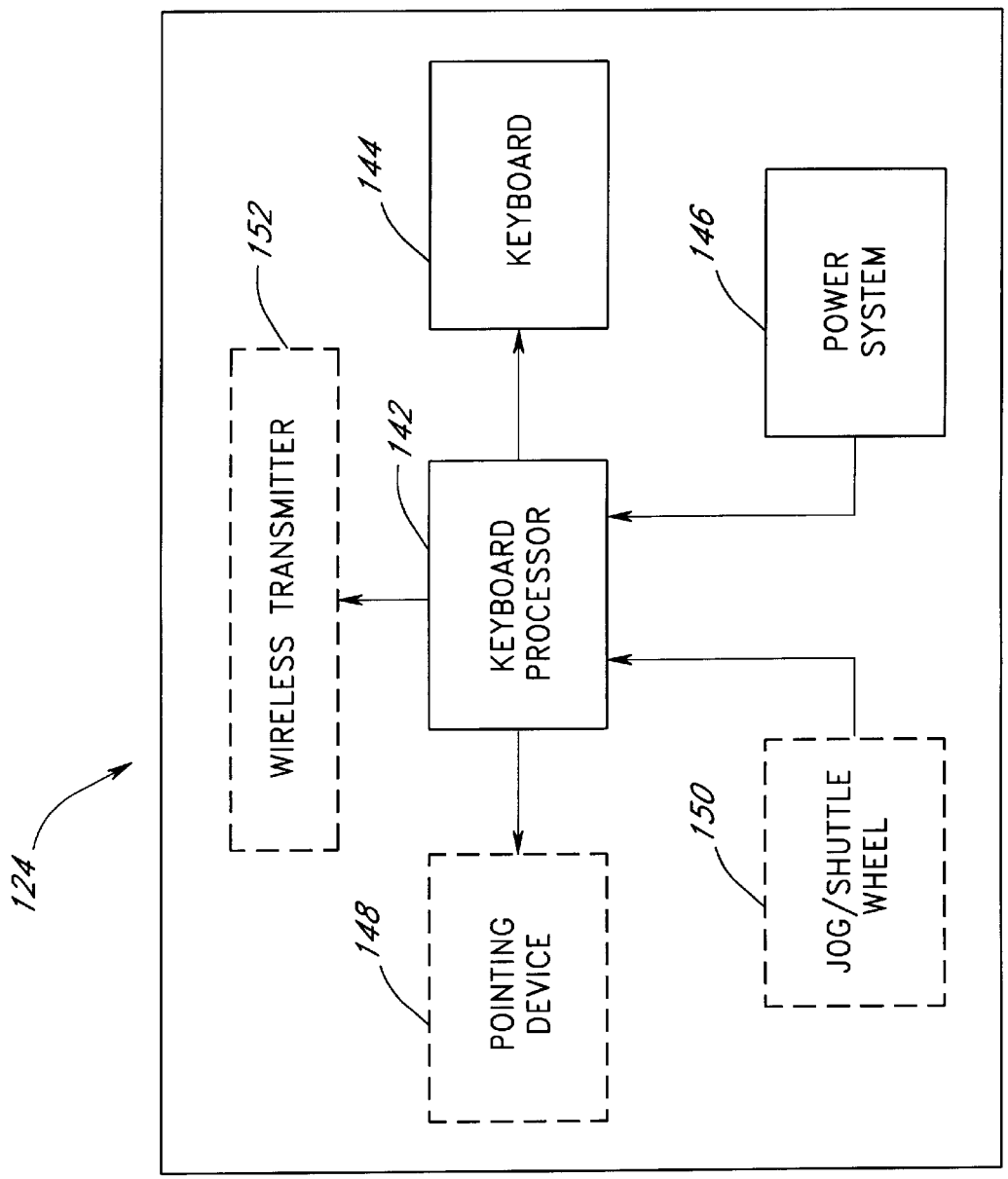
FIG. 3 is a block diagram illustrating the major functional units of the remote control shown in FIG. 2.

Referring now to FIG. 3, a block diagram illustrates the major functional units of the remote control 124. The remote control 124 includes a keyboard processor 142, such as the UR5HCSPI keyboard controller available from USAR Systems, which receives power from a power system 146, such as a battery or AC power source, and processes electrical signals representing user commands from a keyboard 144. The keyboard processor 142 may also accept electrical signals representing user commands from a pointing device 148 and a jog/shuttle wheel 150. Lastly, the keyboard processor 142 may provide its output signal to a wireless transmitter 152, which provides a wireless signal for communication with the main unit 122 (FIG. 1).

FIG. 4a illustrates a front view of one presently preferred embodiment of the main unit 122 of the present invention. FIG. 4b provides a cutaway view of an embodiment of an open connector panel 160 of the main unit of FIG. 4a. The connector panel 160 includes a video signal input 162, such as an RCA receptacle and a S-video receptacle, an audio signal input 164, such as left and right channel RCA receptacles, a microphone input 166 and a headphone output 168 having a volume adjustment. Lastly, FIG. 4c illustrates a rear view of an embodiment of the main unit 122. In a preferred embodiment, the main unit 122 includes a SCSI port 172, an RS232 serial port 174 and a parallel port 176. The main unit 122 may also include a Universal Serial Bus (USB) connector, a PC Card connector and an IrDA compliant infrared port for communication with with various network devices. Moreover, the main unit 122 preferably includes input and output connectors for coaxial cable 178, a composite video input and output connector 180 for video signals from a VCR or video recorder, S-video input and output connectors 182, left/right channel audio output connectors 184 for a television set, left/right channel audio output connectors 186 for a VCR, and left/right channel audio input connectors 188 for an auxiliary audio component, such as a compact disc player.

Figure 5:
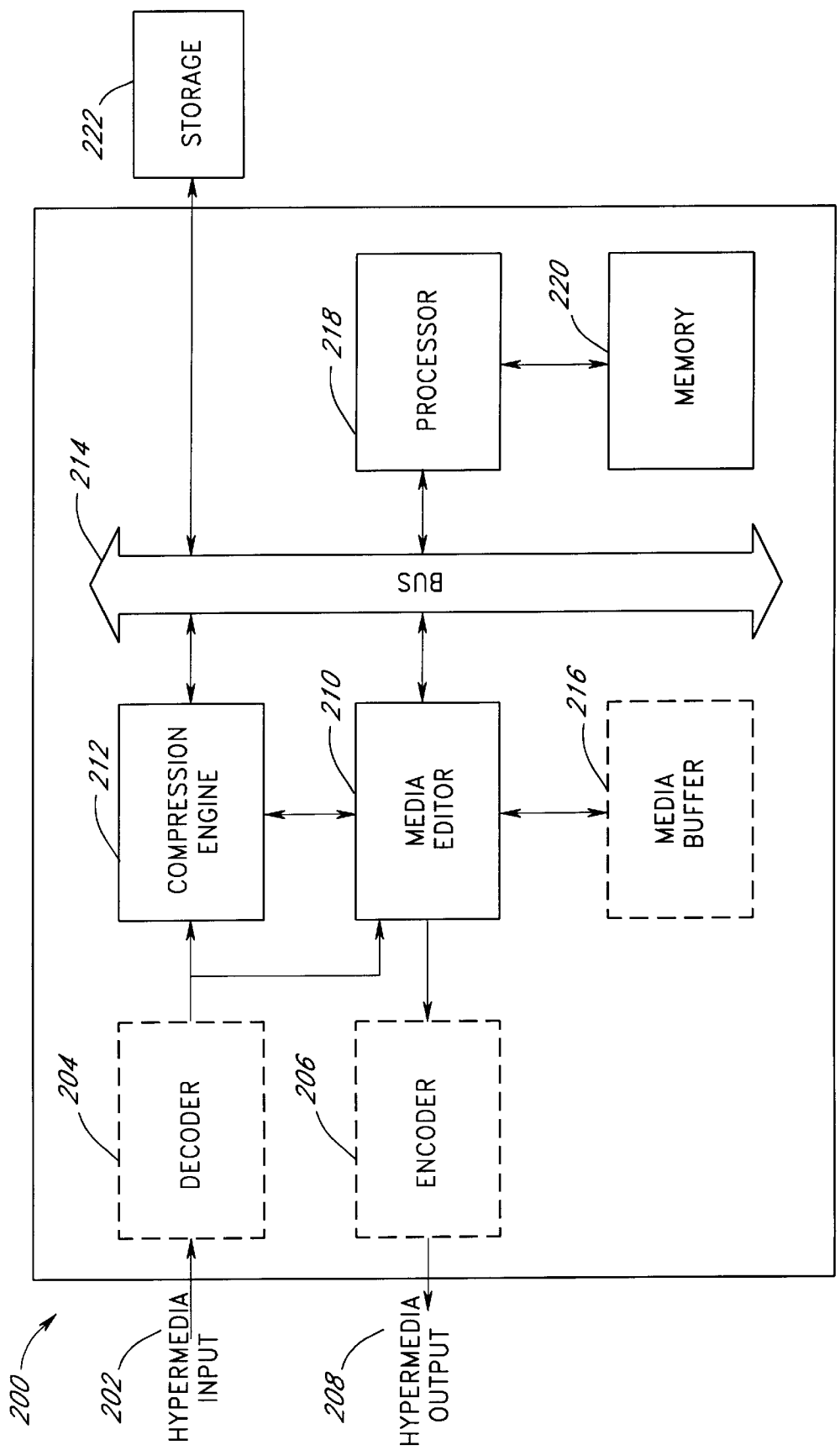
FIG. 5 is a block diagram illustrating the major functional units of a main unit of the present invention.

Referring now to FIG. 5, a block diagram illustrates the architecture of the non-linear editor 200. The non-linear editor 200 receives hypermedia input 202 from a variety of on-line and off-line sources in a wide variety of formats. For example, the non-linear editor may receive separate analog YUV video signals and stereo audio signals from a VCR or multiplexed MPEG data packets from a digital satellite broadcaster. Thus, the non-linear editor 200 may include an optional decoder 204 having an analog to digital converter to convert the hypermedia input 202 into compatible digital data formats, such as CCIR 601 and CCIR 656 compliant bit streams or serial digital audio bit streams, for editing and storage. For example, the decoder 204 may convert encoded scrambled analog signal into decoded descrambled compatible digital data formats having separate audio and video components for subsequent use. Similarly, the non-linear editor 200 may include an optional encoder 206 having a digital to analog converter to convert compatible digital data format into a hypermedia output 208. For example, the encoder 206 may convert a compatible digital data format, such as a 24 bit RGB color bitmap file, into a hypermedia output 208 including an analog YUV signal for an interlaced television display with a separate synchronized analog stereo signal for home speakers or headphones.

The non-linear editor 200 includes a media editor 210 in communication with a compression engine 212, which compresses and decompresses data, a bus 214, and an optional media buffer 216 for temporary storage. The non-linear editor 200 likewise includes a processor 218 in communication with the bus 214, a memory 220 and a storage 222. The media editor 210 and the compression engine 212 simultaneously receive the hypermedia input 202. In this manner, the compression engine 212 compresses and transfers the hypermedia input 202 through the bus 214 for storing in the storage 222 while the media editor 210, which performs non-linear editing functions, advantageously provides for the output and manipulation of the hypermedia input 202. The processor 218 administers access to the bus 214 and to the storage 222 and uses the memory 220 as a local storage area for program instructions and as a buffer for data. Thus, the media editor 210 communicates with the processor 218 and the storage 222 via the bus 214. The processor 218 also supports communication interfaces (not shown), such as SCSI ports, serial ports, parallel ports, IrDA compliant infrared ports, USB ports, Musical Instrument Digital Interfaces (MIDI), PCMCIA/PC Card interfaces, IEEE 1394 Firewire and Smart Card interfaces, for additional network and hypermedia devices.

In one presently preferred embodiment, the compression engine 212 provides data compression and decompression using wavelet techniques. In another preferred embodiment, the compression engine 212 provides data compression and decompression using discrete cosine transform (DCT) techniques, such as JPEG, MPEG-1, MPEG-2 and MPEG-4. Similarly, the processor 218 preferably comprises a conventional embedded controller, such as a Hitachi SH7032, IBM PowerPC 403 or an Intel i860, although a general purpose microprocessor may be used. In addition, the memory 220 may preferably be embodied as one or more of various types of electronic memory, such as DRAM, SRAM, ROM, EPROM, EEPROM and flash memory. Similarly, the storage 222 may preferably be embodied as one or more of various types of direct access non-volatile storage devices, such as magnetic, magneto-optic and optical disk drives. As is well known in the technology, the bus 214 comprises a set of conductors, or wires, for the transfer of data and addresses among the compression engine 212, the media editor 210, the processor 218 and the storage 222. In one presently preferred embodiment, the bus 214 operates at 33 MHz and transfers 32 bits of information in each cycle.

The dual paths of the hypermedia input 202 enable simultaneous viewing and editing of hypermedia during capture. For example, a hypermedia input 202 comprising an MPEG compressed digital video bit stream is captured directly to the storage 222 by transfer through the bus 214 without modification by the compression engine 212 since the hypermedia input 202, an MPEG bit stream, is already compressed. In parallel, the media editor 210 concurrently receives the hypermedia input 202, determines the hypermedia input 202 is a compressed MPEG bit stream, and communicates with the compression engine 212 to decompress the MPEG bit stream for editing and output to an output device, such as a television set. In contrast to conventional personal computer expansion bus devices, the dual paths of the present invention eliminate the need to transfer large amounts of data from the storage 222 through the bus 214 to the media editor 210 during hypermedia capture. As a consequence, the dual path design likewise reduces the need for additional memory, bandwidth and processor computing power, thereby reducing system cost substantially.

II. The Media Editor

Figure 6A:
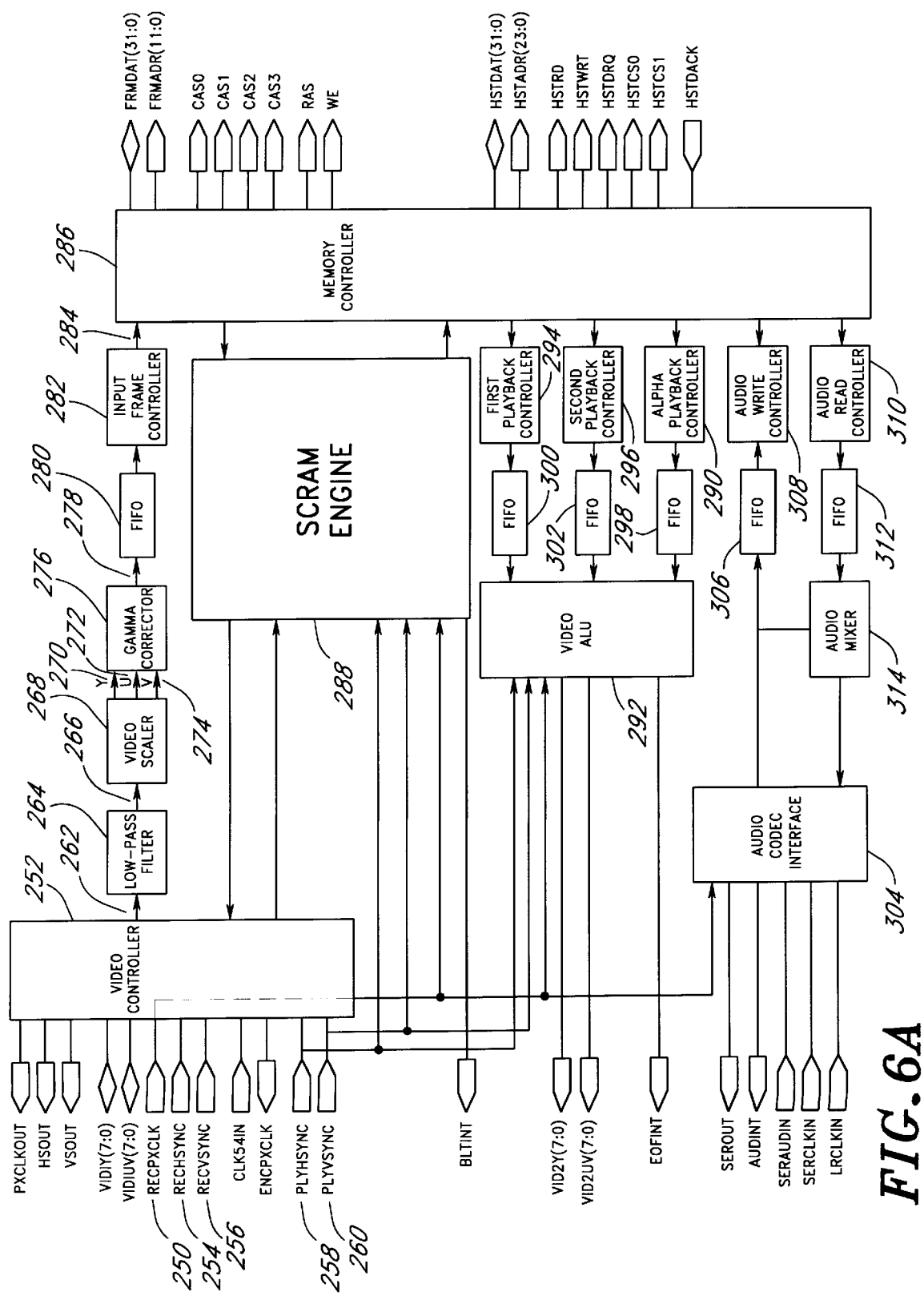
FIG. 6a is a block diagram illustrating the architecture of a media editor of the present invention.

Referring now to FIG. 6a, a block diagram illustrates the architecture of the media editor 210. As discussed above, hypermedia input 202 (FIG. 5) is simultaneously compressed to the storage 222 while streaming to the media editor 210 via a video controller 252. To prevent displayed images from jumping when viewed, the video controller 252 synchronizes the video output signals independently of the input video signals. Thus, the input horizontal and input vertical synchronization signals fed across lines 254, 256 are not used to control the output horizontal and output vertical synchronization signals fed across lines 258, 260. However, independent frame synchronization often results in a "tearing" distortion of unmanipulated, or pass-through, video images. The present invention eliminates "tearing" distortions through a design whereby hypermedia input 202 and hypermedia output 208 share the same master pixel clock 250. Thus, the media editor 210 produces a stable video output from the video portion of a hypermedia input 202, which may include unstable and distorted feeds from multiple, unsynchronized, real-time video sources.

The video controller 252 provides the video portion 262 of the hypermedia input 202 to a programmable low-pass filter 264, such as a Faraday FL676 or a Micro Linear ML6420, to remove high frequency aliasing components so as to form a filtered video signal 266. In turn, the filtered video signal 266 is fed to a programmable video scaler 268, such as a Phillips SAA 7140A or SAA 7186. The filtered video signal 266 improves the output quality of the video scaler 268, which enables resizing of a video image frame to a selected size for viewing and editing. The video scaler 268 outputs a scaled YUV video signal comprising a luminance signal 270 and two color difference signals 272, 274. A gamma corrector 276 receives the signals 270, 272, 274 and performs gamma correction for the non-linear illumination of cathode ray tube (CRT) displays in addition to various color effects, such as posterization, negative imagery, tints and enhancements. In a preferred embodiment, the gamma corrector 276 is implemented as a lookup table in semiconductor memory. The resulting gamma corrected signals 278 are fed to a first-in, first-out (FIFO) buffer 280, then to an input frame controller 282, which assembles gamma corrected signals 278 into a video frame 284. A memory controller 286 receives and transfers the video frame 284 to the media buffer 216 (FIG. 5) for rapid access by the media editor 210. In contrast to conventional memory controllers for PC based non-linear editing systems, which access multiple devices using a wide variety of fetches, such as cache burst, DMA, and CPU instruction or data fetches, the memory controller 286 of the present invention is preferably optimized for multiple sequential fetches of large memory blocks.

To perform a transition between a first and a second sequence of frames using a selected first frame and a selected second frame, each representing their respective frame sequences, the input frame controller 282 stores the first frame selected from the first frame sequence in a first location of the media buffer 216. Similarly, the input frame controller 282 stores the second frame selected from the second frame sequence in a second location of the media buffer 216. In response to the consumer's input, the non-linear editor 200 (FIG. 5) creates an alpha frame, which describes how to combine the first and second frames so as to form the transition, and stores the alpha frame in a third location of the media buffer 216. An alpha frame is a video frame including an alpha value for each pixel, instead of a pixel value representing a color in a conventional video frame. The alpha value defines a mix level between corresponding pixels of the first and second frames. A SCRAM engine 288 retrieves the first frame, the second frame and the alpha frame from the media buffer 216. Upon retrieving these frames, the SCRAM engine 288 forms a transition frame, on a pixelated basis, by combining the pixels of the first, second and alpha frames according to the equation:

Transition Frame pixel=[(First Frame pixel * Alpha Frame pixel)+ Second Frame pixel * (1−Alpha Frame pixel)].

where each pixel in an alpha frame is normalized to a value between zero and one inclusive. Lastly, the SCRAM engine 288 provides the transition frame to the memory controller 286. The memory controller 286 may transfer the transition frame to the media buffer 216 (FIG. 5) or to the compression engine 212 (FIG. 5), which compresses the transition frame data for subsequent transfer to the bus 214 (FIG. 5) for capture in the storage 222 (FIG. 5). In a preferred embodiment, the media editor 210 includes the Applied Magic Video Processor.

A consumer may set the pixel values for any of the first, second and alpha frames equal to a constant, indicating a single color for the entire frame. In response, the SCRAM engine 288 does not retrieve the frames, but instead uses the specified constant values to calculate the transition frame. For example, the transfer of an alpha frame typically requires a 10 Megabyte/sec bandwidth and the transfer of a first or second video frame typically requires a 20 Megabyte/sec bandwidth. To reduce bandwidth and media buffer memory, the SCRAM engine 288 uses a single constant value for transitions, such as a dissolve or fade between a first and second frame sequence, requiring the same constant value for each pixel of the alpha frame. Thus, instead of using 10 Megabytes/sec of bandwidth to transfer alpha frame data, the SCRAM engine 288 uses only 30 bytes/sec for NTSC video or 25 bytes/sec for PAL video. Similarly, for a fade to black, the SCRAM engine 288 uses single constant values for both the alpha frame and the second frame to avoid the use of a further 20 Megabytes/sec of bandwidth to transfer pixel data for both the alpha frame and the second frame. Moreover, in a preferred embodiment, reductions in the bandwidth requirements of the present invention enable the use of a media buffer 216 (FIG. 5) comprising inexpensive DRAM, instead of expensive dual port video RAM (VRAM).

Figure 6B:
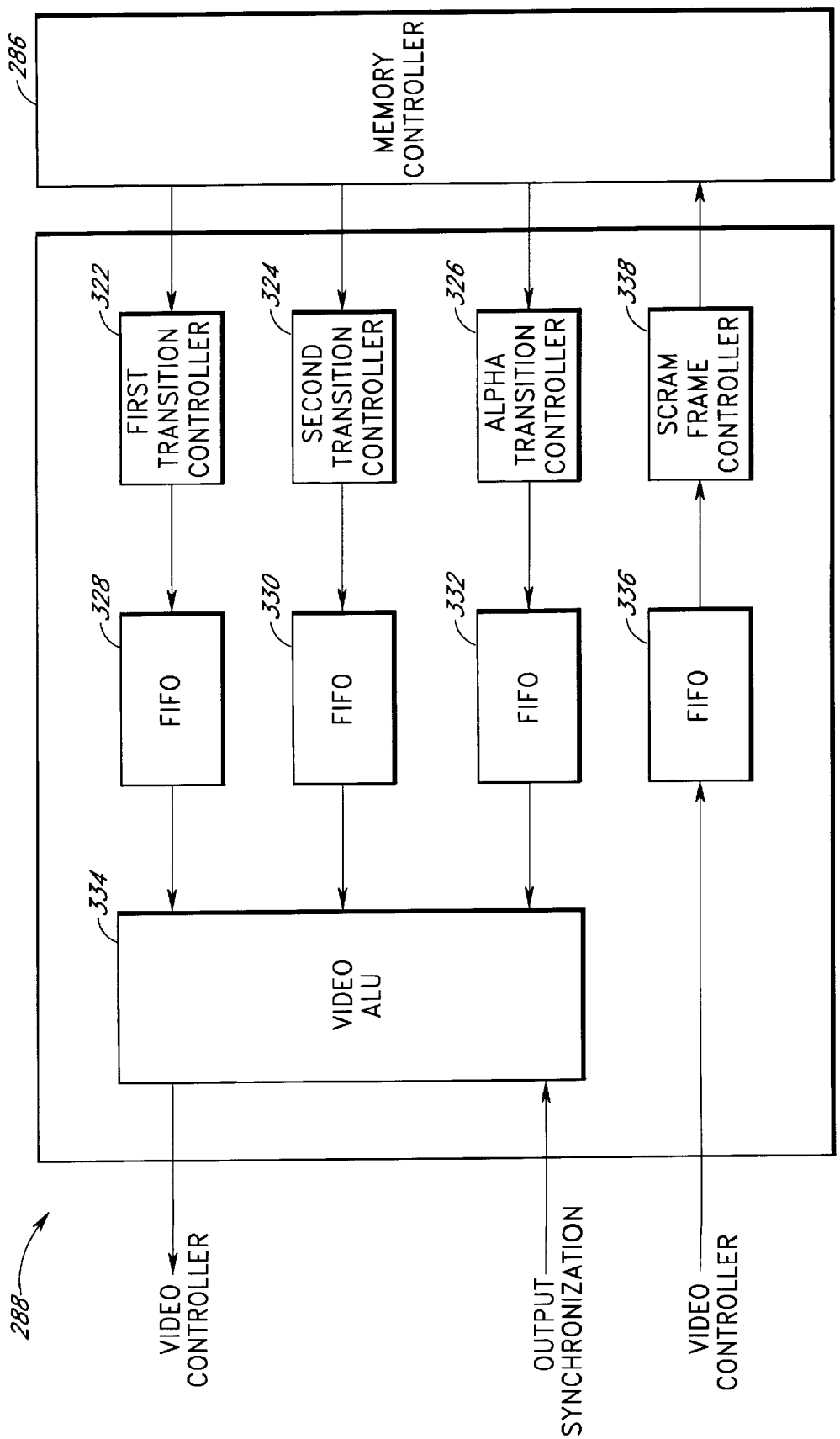
FIG. 6b is a block diagram illustrating the major functional units of a SCRAM engine of the present invention.

Referring now to FIG. 6b, a block diagram illustrates the major functional units of the SCRAM engine 288. To prepare a transition frame, a first transition controller 322, a second transition controller 324 and an alpha transition controller 326 simultaneously communicate fetch requests to the memory controller 286 to retrieve first, second and alpha frame data from the media buffer 216. The memory controller 286 in turn accesses the media buffer 216 (FIG. 5) to retrieve the desired frame data. As the memory controller 286 returns the data, the first transition controller 322 receives and transfers the first frame data to a first FIFO 328. Similarly, the second transition controller 324 receives and transfers the second frame data to a second FIFO 330. The alpha transition controller 326 likewise receives and transfers alpha frame data to a third FIFO 332. The FIFOs 328, 330, 332 buffer the frame data for subsequent processing by a Video ALU 334. The Video ALU 334 determines transition frame pixels by retrieving first frame pixel data from the first FIFO 328, second frame pixel data from the second FIFO 330 and alpha frame pixel data from the third FIFO 332 and performing the following calculation with the pixel data:

Transition Frame pixel=[(First Frame pixel * Alpha Frame pixel)+ Second Frame pixel * (1−Alpha Frame pixel)].

Upon completion of the calculation, the Video ALU 334 returns the calculated transition frame pixels to the video controller 252 (FIG. 6a) for output or storage. For example, the video controller 252 may transfer the transition frame pixel data to a fourth FIFO 336 from which a SCRAM frame controller 338 retrieves and assembles the transition frame pixel data into a transition frame. The SCRAM frame controller 338 then transfers the transition frame to the memory controller 286 for temporary storage in the media buffer 216 (FIG. 5). In a preferred embodiment, when the fourth FIFO 336 is full, the SCRAM frame controller 338 issues a burst write request to the memory controller 286, which results in a burst transfer of the contents of the fourth FIFO 336 through the SCRAM frame controller 338 and memory controller 286 into the media buffer 216. The video controller 252 may also transfer the transition frame pixel data to an output device or to the compression engine 212 (FIG. 5) for compression prior to capture in the storage 222 (FIG. 5).

In a preferred embodiment, the video controller 252 may assign a lower priority to the SCRAM engine 288 to enhance performance of other system functions, such as memory access by playback controllers 290, 294, 296. In response to multiple memory access requests, the memory controller 286 arbitrates using memory access priorities assigned by the video controller 252. When the SCRAM priority is low, the SCRAM engine 288 continues processing at full speed, such as at the end of a video scan line or video field. For example, when the SCRAM engine 288 has a low priority, the memory controller 286 interleaves SCRAM engine 288 memory requests, such as those from the first 322, second 324 and alpha 326 transition controllers, with high priority requests, such as those from the first 294 (FIG. 6a), second 296 (FIG. 6a) and alpha 290 (FIG. 6a) playback controllers. Each of the transition controllers 322, 324, 326 preferably include at least one register to describe the type, size and location of data to fetch. For example, the type may specify a color value, rather than video field data, the location may specify a start address within the media buffer 216 and the size may specify an image portion, such as a 720×576 pixel region or a 4×1 pixel region. Similarly, each of the transition controllers 322, 324, 326 preferably issues burst access requests to the memory controller 286 so as to fill the corresponding FIFO 328, 330, 332 with data returned by the memory controller 286 in response to the request. However, when a transition controller 322, 324, 326 is configured to output a constant color value instead of video data, there is no fetch request to the memory controller 286. Instead, the corresponding FIFO 328, 330, 332 is burst filled with the constant color value. For transition operations, the Video ALU 334 preferably operates at a speed greater than that required to calculate transition frame pixels for output at real-time video data rates. Similarly, for other SCRAM operations, the Video ALU 334 preferably operates at a speed greater than the real-time data rates. Lastly, when the priority of the SCRAM engine 288 is high, the SCRAM frame controller 338 is disabled and each of the transition controllers 322, 324, 326 operates at full resolution.

In contrast to prior art block memory movers, the SCRAM engine 288 provides for complex mixing of multiple hypermedia objects. The SCRAM engine 288 is also useful as a drawing tool. As discussed above, a consumer may set the pixel values for any of the first, second and alpha frames equal to a constant, indicating a single color for the entire frame. For example, according to the transition frame equation, when an alpha frame pixel=1, all transition frame pixels are identical to the first frame pixels. Thus, if a consumer sets the first frame to a constant, representing a single color, and the alpha frame=1, then the first 322, second 324 and alpha 236 transition controllers retrieve no frame data and the SCRAM engine 288 operates to draw a box of the selected color at high speed. When elements of the SCRAM engine 288 are not retrieving frame data, other controllers within the SCRAM engine 288, as well as the processor 218, may access the memory controller 286 to use the available system bandwidth. Thus, a consumer may play back a real-time hypermedia feed while the SCRAM engine 288 prepares a transition. Moreover, the SCRAM engine 288 is preferably capable of performing transitions for real-time hypermedia sources in addition to non-real-time hypermedia sources.

To play back video transitions, an alpha playback controller 290 communicates a fetch request to the memory controller 286 to retrieve selected alpha frames from the media buffer 216 (FIG. 5). The alpha playback controller 290 provides the retrieved alpha frames to a Video Arithmetic Logic Unit (ALU) 292 to combine with the first and second frames so as to form transition frames. In a similar manner, a first playback controller 294 and a second playback controller 296 simultaneously retrieve the first and second frames from the media buffer 216 through the memory controller 286. The retrieved frames are buffered in corresponding FIFOs 298, 300, 302 for ready access by the Video ALU 292. The Video ALU 292 uses the retrieved alpha frames to combine the first and second frames retrieved so as to form a transition frame for output to an encoder 206 (FIG. 5) or to a viewing device. Moreover, for unmodified video, the present invention likewise reduces playback bandwidth and eliminates unnecessary memory fetches by disabling the second playback controller 296 and the alpha playback controller 290 to free up 30 Megabytes/sec of bandwidth for other system uses. A similar 30 Megabyte/sec bandwidth reduction would result from fade to black during playback. The alpha playback controller 290 enables more complex playback features, such as real-time rendering of flying or scrolling text overlays, moving pre-rendered graphical objects onto an image from a variety of hypermedia sources, and providing on-screen controls on top of the playing video. The Video ALU 292 receives input from three real-time video paths, the master pixel clock 250, an alpha path having mixing information for two full color video input paths, and serves as the primary video output of the media editor 210. The combination of the Video ALU 292, the playback controllers 290, 294, 296, and the FIFOs 298, 300, 302 is collectively referred to as the playback engine.

The media editor 210 also provides for the playback, capture and mixing of multiple audio channels, each channel having a left and right input with individual volume controls. An audio codec interface 304 receives the audio portion of the hypermedia input 202 (FIG. 5) and outputs the audio portion of the hypermedia output 208 (FIG. 5). The audio codec interface 304 buffers audio samples for playback of all audio channels to an audio write FIFO 306. An audio write controller 308 transfers audio samples retrieved from the audio write FIFO 306 to the memory controller 286 for storage in contiguous memory locations in the media buffer 216 (FIG. 5) or in the storage 222 (FIG. 5) by transfer through the bus 214. To play back captured audio samples, an audio read controller 310 retrieves selected audio samples from the media buffer 216 (FIG. 5) or the storage 222 (FIG. 5) by issuing a fetch request to the memory controller 286. The audio read controller 310 buffers retrieved audio samples in an audio read FIFO 312, which communicates with an audio mixer 314, wherein volume information for each channel is added to audio samples retrieved from the audio read FIFO 312. Lastly, the audio mixer 314 provides a mixed audio sample having channel volume information to the audio codec interface 304, which synchronizes the mixed audio sample with video for output using the master pixel clock 250.

The memory controller 286 manages the interface between the media editor 210 and the media buffer 216. In a preferred embodiment, the media buffer 216 comprises dynamic RAM (DRAM) memory, instead of costly dual port video RAM (VRAM). To satisfy DRAM timing and access constraints, the memory controller 286 provides arbitrated burst access to the media buffer 216 from the media editor 210. As multiple controllers within the media editor 210 access the media buffer 216, the memory controller 286 uses bank interleaving to improve access performance by avoiding page misses. Bank interleaving exploits the performance of the DRAM memory. By allocating video frames in a selected order, the memory controller 286 can perform fetches without page misses. One embodiment of a bank interleaving scheme which eliminates page misses and optimizes use of available memory bandwidth is as follows:

1. Activate memory bank 0 with a row address from the alpha playback controller 290;
2. Burst read the alpha frame data while activating Bank 1 with a row address from the second playback controller 296 for second frame data;
3. Interrupt the transfer to the alpha playback controller 290 after 'x' cycles to transfer second frame data to the second playback controller 296, activate bank 0 again with a row address from the first playback controller 294;
4. Burst read second frame data for '2x' cycles;
5. Burst read first frame data for '2x' cycles.

Note that a bank interleaving scheme optimized to avoid page misses is dependent upon the number of concurrent active memory accesses. In a preferred embodiment, the memory controller 286 locates video frame data within the media buffer 216 so as to avoid page misses when retrieving video frame data. Moreover, the memory controller 286 prioritizes access to the media buffer 216. For example, when the alpha playback controller 290, the first playback controller 294, the second playback controller 296 and the input frame controller 282 require real-time access, the memory controller 296 sets the access priorities so as to ensure that each controller receives its data when needed. The memory controller 286 is preferably programmable so that the priority of access for each operational mode is selectable. Lastly, due to the relatively small bandwidth for audio access as compared to video access, the audio read controller 308 and the audio write controller 310 may access the media buffer 216 at all times.

III. Operation of the Non-Linear Editing System

Figure 7:
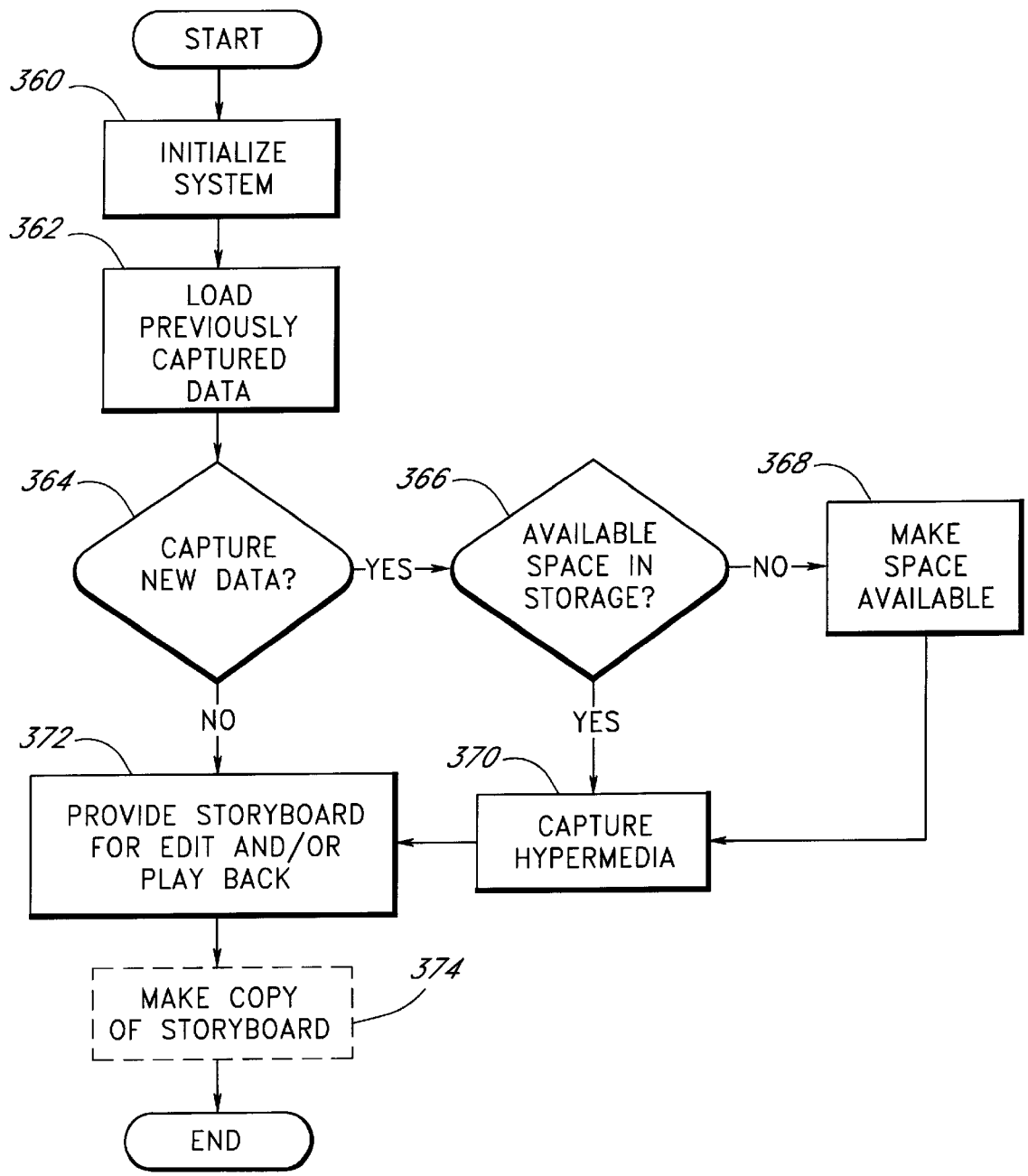
FIG. 7 is a flowchart illustrating a method of operating the non-linear editing system of the present invention.

A consumer may use the non-linear editing system 100 (FIG. 1) to capture, manipulate, interact with, transport and play back hypermedia from a plurality of concurrent, independent hypermedia sources. FIG. 7 illustrates a method of operating the non-linear editing system 100. At state 360, a consumer initializes the system 100 by powering on the main unit 122 (FIG. 1). In a preferred embodiment, the consumer depresses the "On" button of the remote control 124 (FIG. 1). During initialization, the system 100 may perform a power on self test (POST) to determine if all of its components, such as the memory 220 (FIG. 5), are functioning properly. Additionally, the processor 218 (FIG. 5) loads an embedded operating system, preferably the Microware OS9000 for the IBM PowerPC 403, and software instructions for the GUI and non-linear editing functions from the memory 220. In a preferred embodiment, the software instructions for the non-linear editing system 100 are stored in a programmable control ROM portion of the memory 220. In contrast to prior art systems, previously captured data is automatically loaded at state 362. Moreover, at state 362, the system 100 is preferably restored to its condition immediately prior to the last power down. Advantageously, a consumer may proceed with all tasks in progress as if the system 100 had not been powered down. At state 364, a determination is made whether to capture new data. If new data is not desired, the system 100 provides a storyboard having previously captured data at state 372, wherein a consumer may edit and play back the storyboard. A storyboard is a sequential representation of a clip having video, audio, stills, effects and other hypermedia, presented as a picture icon. The sequence runs from left to right in a top to bottom order. If new data is desired, the system 100 checks the storage 222 (FIG. 5) for available space at state 366. If there is no available space in the storage 222, the system proceeds to state 368 to make space available. Otherwise, the system 100 captures hypermedia at state 370 and proceeds to state 372 where the system 100 automatically provides a storyboard having the captured hypermedia. Lastly, at state 374, a consumer may create a copy of a storyboard to a recordable DVD or videotape.

Figure 8:
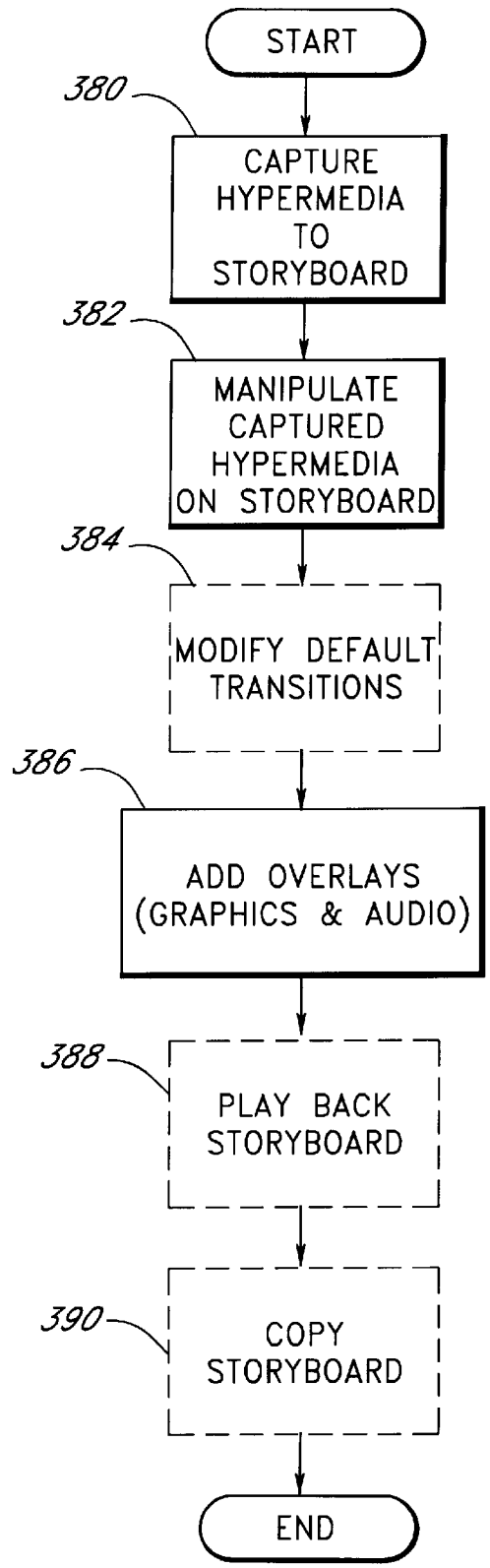
FIG. 8 is a flowchart illustrating a method of manipulating hypermedia of the present invention.

Referring now to FIG. 8, a flowchart illustrates a method for manipulating hypermedia. At state 380, a consumer captures hypermedia to a storyboard. The storyboard often includes a plurality of captured hypermedia portions, or clips. At state 382, the consumer manipulates the captured hypermedia on the storyboard. The non-linear editing system 100 (FIG. 1) preferably includes selected default transitions between each pair of clips automatically. For example, consumers manipulate clips by enhancing them with graphics, text and audio annotations. Consumers may likewise enhance electronic mail (e-mail) by excerpting, editing and attaching the edited clips to their e-mail messages. Consumers also manipulate clips by compiling a sequence of clips and creating the transitions between each pair of clips. Additionally, consumers may manipulate clips by incorporating digitized photographs, synchronized music and other forms of digital hypermedia captured from the Internet via the Internet browser functionality incorporated into the non-linear editing system 100. For example, a consumer may manipulate a clip by excerpting a video still or a digital photograph from a clip for placement on a World Wide Web page or for printout as a photograph or postcard. At state 384, the consumer may modify the default transitions selected by the non-linear editing system 100. Moreover, at state 386, the system 100 enables consumers to add overlays, such as graphical and audio annotations of clips. Lastly, consumers may play back their storyboards at state 388 or copy their storyboards at state 390. Consumers preferably copy the hypermedia represented by storyboards to videotape machines, such as a VCR or camcorder.

Figure 9:
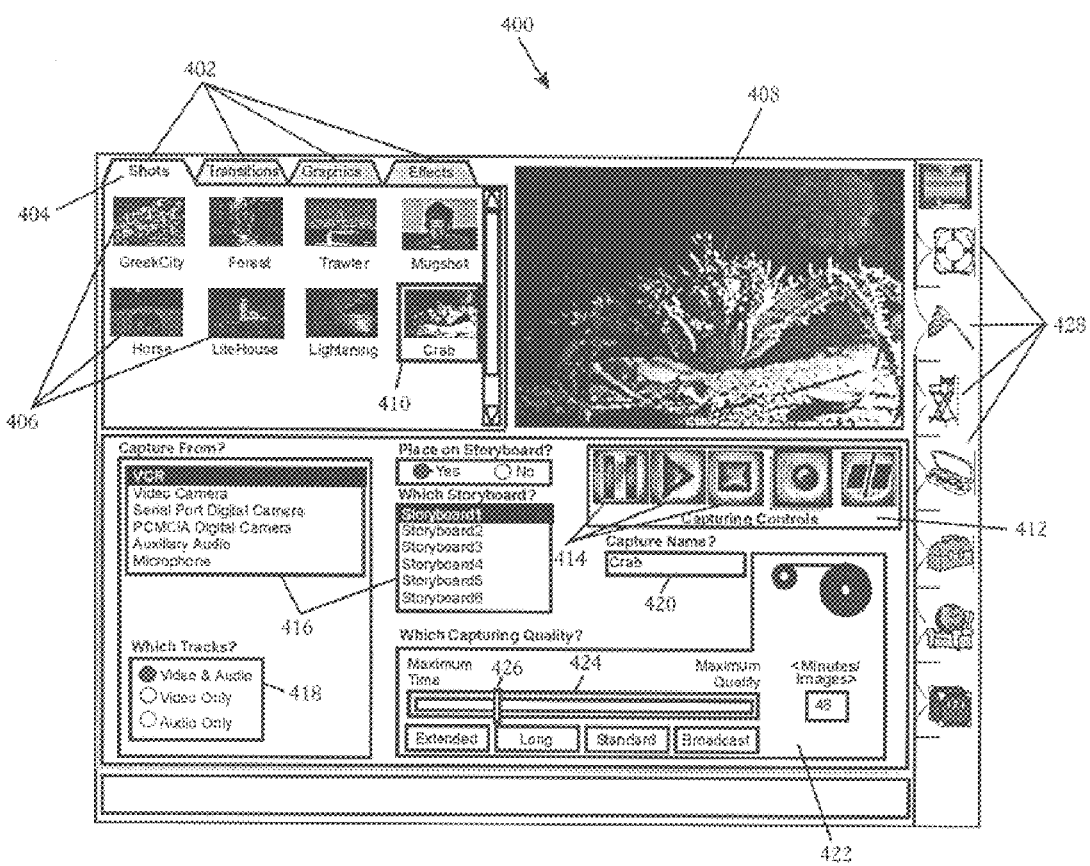
FIG. 9 illustrates an embodiment of a graphical user interface for the capture of hypermedia.

FIG. 9 illustrates an embodiment of a graphical user interface 400 useful for the capture of hypermedia. The capture GUI 400 provides a plurality of tabs 402 enabling selection of various functions of the non-linear editing system 100. In capture mode, the capture GUI 400 preferably includes a shot tab 404 displaying icons 406 representing previously captured clips. The capture GUI 400 likewise includes a display window 408 to display an image from a clip referenced by a selected icon 410. Moreover, the capture GUI 400 includes a control panel 412 displaying a plurality of buttons 414 representing capture functions, such as record, play, stop and pause. Similarly, the capture GUI 400 provides for the selection of capture properties using at least one drop down menu 416. For example, using the drop down menu 416, a consumer may instruct the non-linear editing system 100 to capture from a VCR to Storyboard 1 as illustrated in FIG. 9. The capture GUI 400 may also include a selection box 418 to specify hypermedia data types to capture as well as an entry box 420 to specify a clip name. The capture GUI 400 may additionally include a quality window 422 having a slide bar 424 and a slider 426. The consumer selects the capture quality by manipulating the slider 426 within the slide bar 424. Lastly, the capture GUI 400 includes an icon bar 428 having icons representing the different modes of the non-linear editing system 100. The consumer manipulates the capture GUI 400 using the point and click functionality of the pointing device 134 (FIG. 2b) to select and manipulate items within the capture GUI 400 in coordination with the keyboard 130 (FIG. 2b) to provide keyboard inputs as needed.

Figure 10:
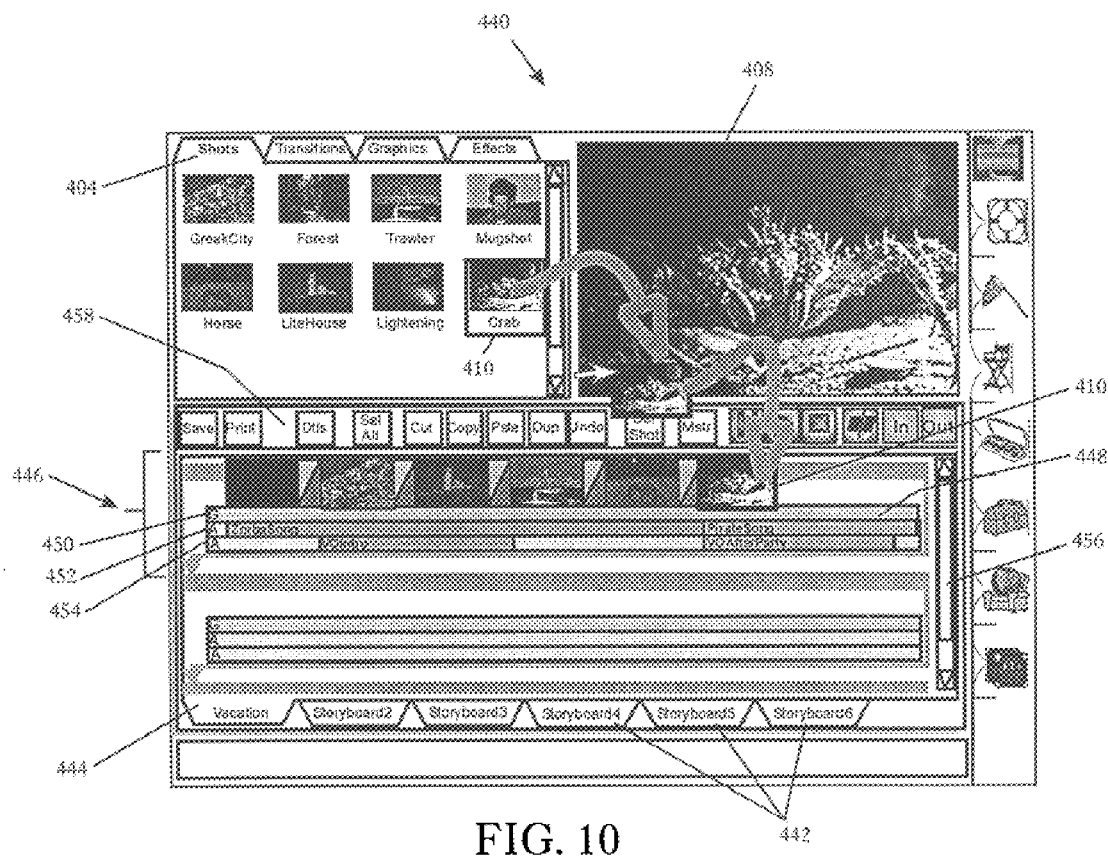
FIG. 10 illustrates an embodiment of a graphical user interface having a storyboard.

FIG. 10 illustrates an embodiment of a storyboard GUI 440. As discussed previously, the storyboard GUI 440 includes a shot tab 404 displaying icons 406 representing previously captured clips. The storyboard GUI 440 likewise includes a display window 408 to display an image from a clip referenced by a selected icon 410. In addition, the storyboard GUI 440 includes a plurality of storyboard tabs 442, each tab referencing a selected storyboard having a sequence of clips with transitions. For example, a vacation tab 444 includes a vacation storyboard 446 having six clips, corresponding to the image icons, and five transitions, one transition between each pair of clips. The vacation storyboard 446 includes a time ruler 448 having a graphics bar 450, a first audio bar 452 and a second audio bar 454. The bars 450, 452, 454 indicate the name and duration of the hypermedia portion corresponding to the clip represented by the icon above the bar. Each of the storyboard tabs 442 includes a scroll bar 456 to scroll down the window illustrating the storyboard corresponding to the selected tab. To add a clip to a storyboard, the consumer selects the shots tab 404 and one of the storyboard tabs 442 of interest, such as the vacation tab 444, to display the storyboard 446. The consumer then selects, drags and drops a clip icon 410 onto the storyboard 446 as shown in FIG. 10. The non-linear editing system 100 automatically provides a default transition on the storyboard immediately prior to the newly added clip 410. Lastly, the storyboard GUI 440 includes a button panel 458 having a plurality of buttons corresponding to a wide variety of editing functions for the storyboard 446, such as save, print, cut, copy and paste. A consumer may edit a storyboard 446 using the point and click functionality of the storyboard GUI 440 in conjunction with the functions corresponding to buttons comprising the button panel 458.

The storyboard GUI 440 preferably displays the sequence of items on a storyboard instead of their absolute time scales. Thus, icons of a single size represent each captured clip, regardless of its actual duration. However, other data on the storyboard associated with a captured clip is represented by an indicator having a size and location corresponding to the temporal relationship with the captured clip. For example, an audio clip having a duration of half the length of a captured clip appears on a first 452 or second 454 audio bar under the icon of the captured clip with an indicator bar half the length of the icon. Moreover, for a half length audio clip synchronized to begin at one quarter of the clip duration, the indicator bar appears indented one quarter of the icon width from both sides, corresponding to a start at one quarter clip duration and a termination at three quarter clip duration. Thus, the time ruler 448 of the present invention, referred to as a cartoon timeline, illustrates the sequential relationship of events. Advantageously, the cartoon timeline metaphor eliminates the need for consumers to zoom in on various portions of the storyboard to identify and manipulate clips, thereby improving the usability of a storyboard GUI 440. Similarly, the cartoon timeline metaphor of the present invention eliminates the need for a high resolution computer graphics monitor as a high quality image of the storyboard GUI 440 can be rendered on a conventional television set. Moreover, the cartoon timeline metaphor eliminates the need to render a minute sliver of an icon, representing a captured clip of extremely short duration, on a low resolution television screen for consumer viewing from relatively large distances. Lastly, in contrast to prior art systems, the cartoon timeline metaphor of the present invention illustrates the relationship between associated data, such as audio and graphical annotations, and the captured clips through indicator bars, which are relative in nature as opposed to absolute in time.

Figure 11:
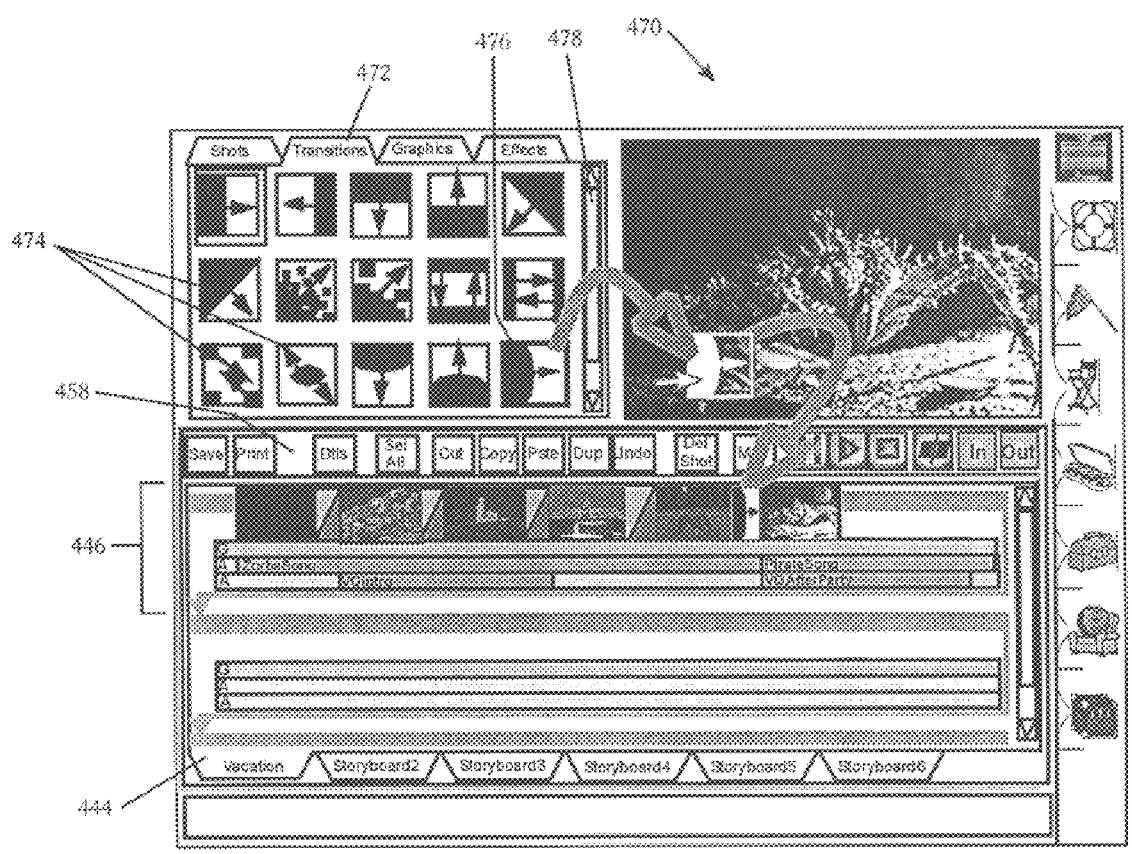
FIG. 11 illustrates an embodiment of a graphical user interface for the creation of a transition.

FIG. 11 illustrates an embodiment of a transition GUI 470. As shown in the storyboard GUI 440 (FIG. 10), the transition GUI 470 includes a vacation tab 444 having a vacation storyboard 446 and a button panel 458 having a plurality of buttons corresponding to editing functions. In the transition GUI 470, the transitions tab 472 is selected to display a plurality of icons 474, each icon representing a predetermined transition effect. As before, to change a transition, the consumer selects, drags and drops a desired transition icon 476 on the storyboard 446 at a location between a pair of clips. The consumer may likewise edit the transitions of a storyboard 446 using the point and click functionality of the transition GUI 470 in conjunction with the functions corresponding to button comprising the button panel 458. Note that the transitions tab 472 includes a scroll bar to scroll down the window illustrating the icons corresponding to various transition effects.

Figure 12:
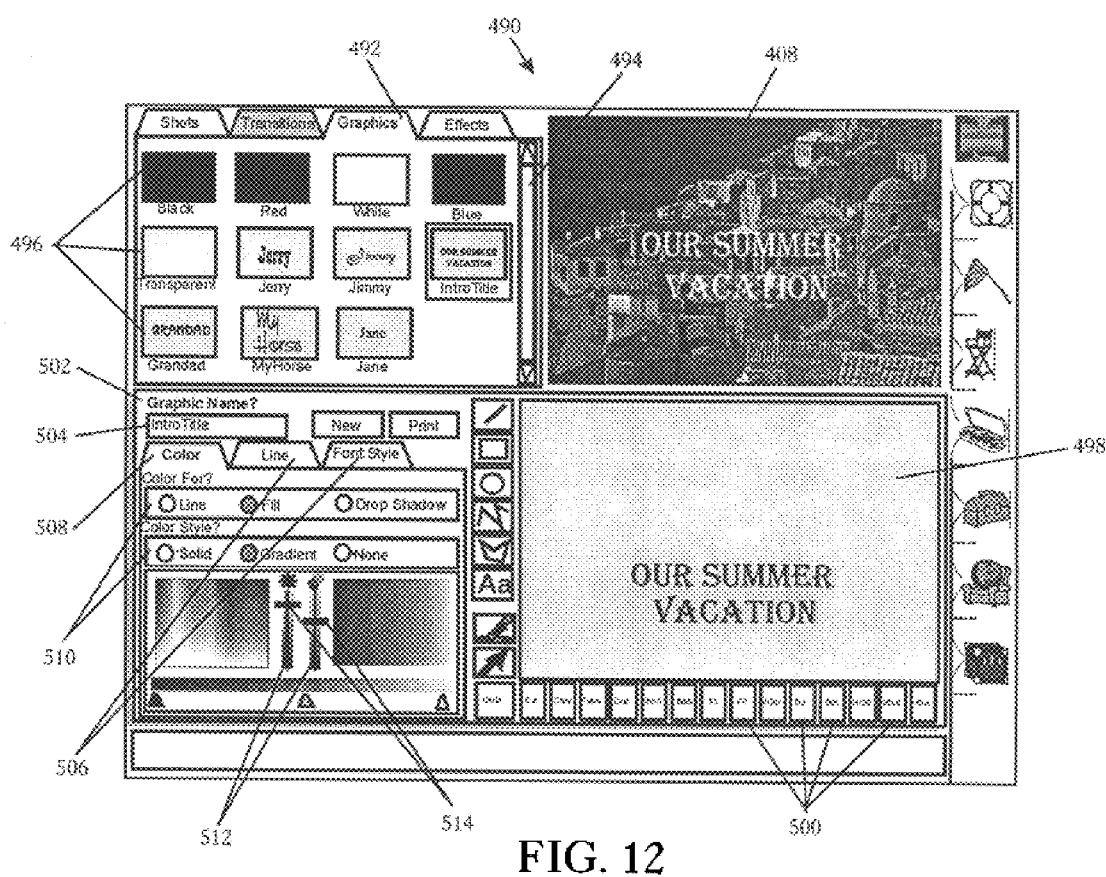
FIG. 12 illustrates an embodiment of a graphical user interface for the creation of graphics.

FIG. 12 illustrates an embodiment of a graphics GUI 490. The graphics GUI 490 includes a graphics tab 492 having a scroll bar 494 and a plurality of icons 496 representing various graphics overlays, such as color, titles, and text on color. The graphics GUI 490 similarly includes a display window 408 to display an image for graphical editing. The graphics GUI 490 also includes an image edit window 498 having a plurality of image editing tool buttons 500, such as a line tool, a box tool, a text tool, cut, copy and paste, about the periphery of the image edit window 498. As before, a consumer uses the point and click functionality of the remote control 124 (FIG. 2b) to select and manipulate the image editing tool buttons 500. Moreover, the graphics GUI 490 includes a features portion 502. The features portion 502 includes an name box 504, wherein the consumer may select a name to identify the edited graphic and a plurality of tabs 506, each tab having property selections for some of the image editing tool buttons 500. For example, a color tab 508 includes selection boxes 510 to select color features of lines, fills and shadows. Lastly, the features portion 502 includes a pair of slider bars 512, each having a slider 514, for the selection of color gradients. Operation of the graphics editor is similar to conventional graphics editors, such as MacPaint and Paintbrush.

Figure 13:
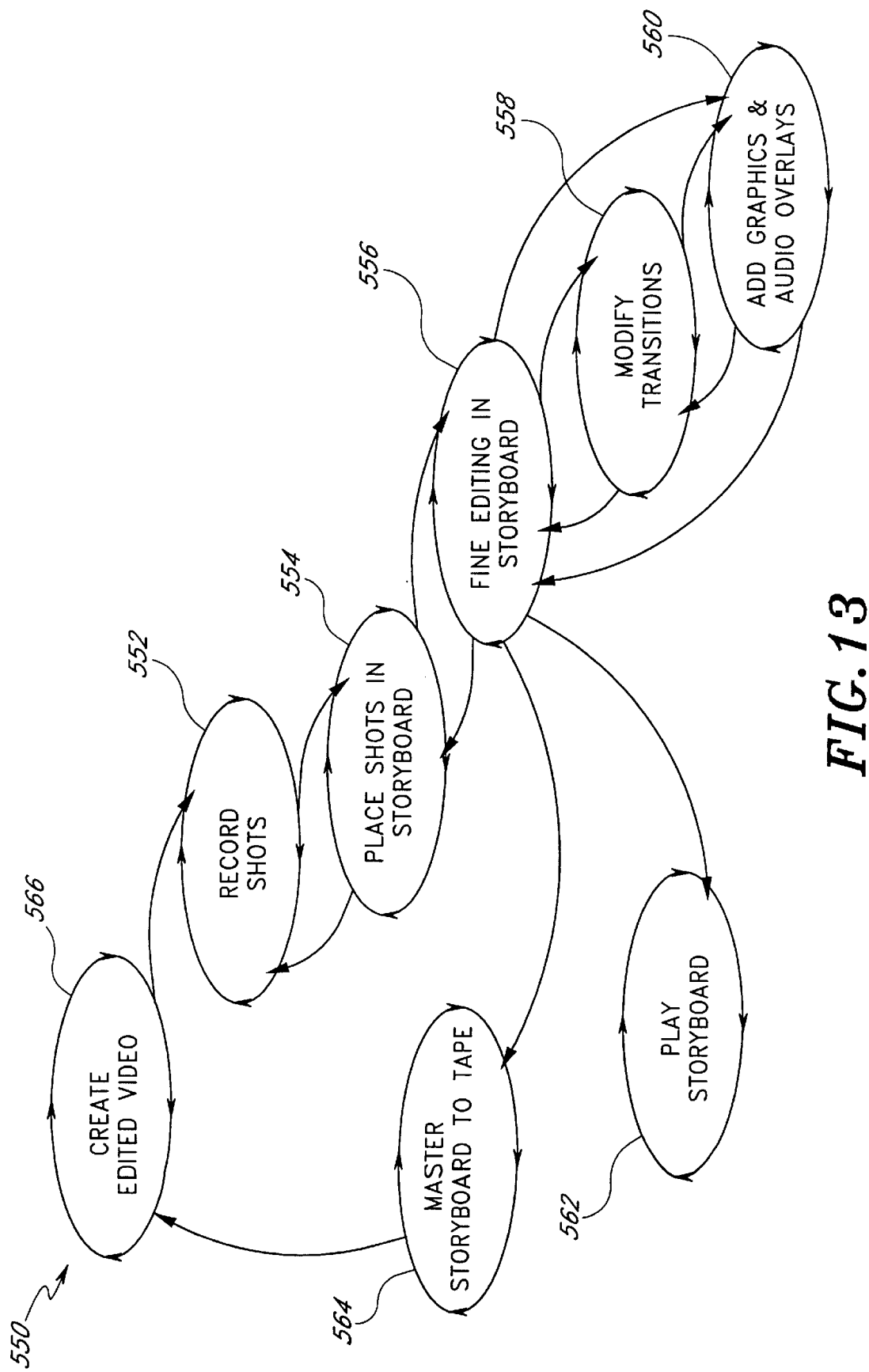
FIG. 13 is a task flow diagram illustrating the tasks a consumer can perform using the graphical user interface of the present invention.

Each major element of the GUI is derived from a list of consumer tasks. FIG. 13 is a task flow diagram 550 illustrating the manipulations a consumer may perform with the non-linear editing system 100. Each of the illustrated tasks is intra-cyclical in nature, meaning that a consumer may perform the task over and over until satisfied with the results. Note that illustrated tasks are also inter-cyclical in that a consumer may pass forward and back to other tasks. As discussed previously, the software functionality for carrying out the tasks is located in the processor 218 (FIG. 5), which loads the software instructions from the memory 220 (FIG. 5). At initialization, the system automatically loads previously captured hypermedia portions from the storage 222 (FIG. 5) and places them into a storyboard so that a consumer may create an edited storyboard. At task 552, a consumer may capture, or digitize for storage, hypermedia portions, or shots, from a hypermedia source. Ultimately, the hypermedia shots are stored in the storage 222 (FIG. 5). During this task, a consumer may perform some "rough" editing by electing not to digitize selected portions that they do not wish to include in the finished master. At task 554, the consumer places captured shots on the storyboard. The storyboard may be thought of as a working portion of the media buffer 216 (FIG. 5). As discussed previously, shots are automatically placed into the storyboard in the order in which they were captured. Similarly, when shots are placed into the storyboard, transitions between shots are automatically generated. At task 556, the consumer may perform "fine" editing of shots, such as moving, duplicating, removing and manipulating the duration of shots. For example, in a storyboard having 5 shots with 4 interposed transitions, a consumer may move the first shot to the end, whereby the system automatically removes the transition between the first and second shots and adds a default transition between the end shot and the first shot. The consumer may likewise modify the transitions at task 558 and annotate shots with overlays, such as graphics and audio, at task 560. Moreover, the consumer may playback the storyboard at task 562 or may save a copy of the storyboard at state 564. When the consumer has completed all desired tasks on this storyboard, the consumer may create another storyboard at task 566.

Figure 14:
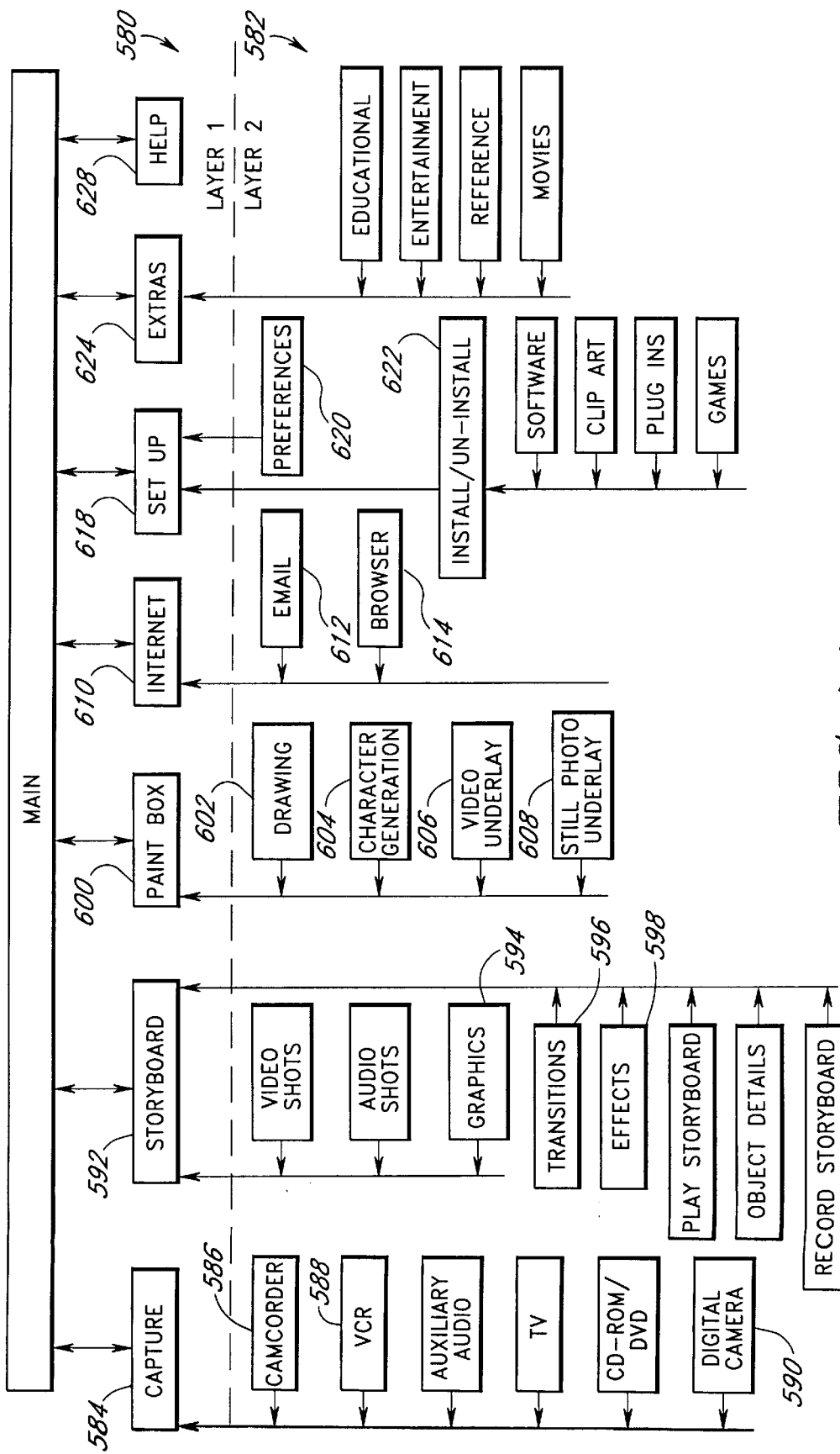
FIG. 14 is a diagram illustrating the display flow of the graphical user interface of FIG. 9.

FIG. 14 is a diagram illustrating the GUI display flow. The GUI is implemented by a non-linear or event based software application. In traditional user interface development, the diagram would represent the menu structure of the application. However, in a presently preferred embodiment, the first layer 580 identifies the major system functions represented by icons 428 (FIG. 9). The second layer 582 identify further functions and features corresponding to the major system functions of the first layer 580. The capture function 584 provides tools to capture from a variety of hypermedia sources, such as a camcorder 586, a VCR 588 and a digital camera 590. The storyboard function 592 provides tools to edit, playback and record shots. Storyboard tools include graphics 594, transitions 596 and effects 598. The paint box function 600 provides additional editing tools for drawing 602, character generation 604, video underlay 606 and still photo underlay 608. The Internet function 610 includes tools for e-mail 612 and a browser plug-in 614, wherein commercially available browsers, such as Internet Explorer and Netscape Navigator, may be integrated. A consumer may add, remove, change or otherwise manipulate hyperlinks using the browser. The set-up function 618 enables configuration of the system by providing tools to indicate preferences 620 and software installation/removal tools 622. The extras function 624 provides extendibility tools to supplement and extend system functions. Lastly, the help function 628 provides tools to access system help documentation.

All objects, such as shots, audio, graphics and transitions, can be manipulated by initiating a details display from the button panel 458 (FIG. 10) after selecting the desired object from the storyboard. The consumer can play the edited hypermedia in a playback area or full screen at any time during the editing process, and when satisfied, the consumer may record the edited hypermedia to an output device, such as a recordable DVD or VCR, by selecting the Select All button on the storyboard display and then selecting the Master button. Thus, rather than a delivery only system for hypermedia, the present invention allows the consumer to, for example, download hypermedia from the Internet and edit or manipulate it through the storyboard program.

IV. Summary

The present invention provides a complete, standalone, economical system that enables consumers to create, manipulate, edit, view and output hypermedia in their homes. In contrast to the prior art, the non-linear editing system of the present invention does not require a consumer to incur substantial expenses to purchase a personal computer having expansion bus add-in cards and software to capture and edit hypermedia in their homes. Similarly, unlike current personal computers, the present invention is adapted for communication with conventional home entertainment components, such as a VCR, television, stereo, camcorder and digital still camera. Moreover, the non-linear editing system of the present invention provides for a wide variety of hypermedia output mediums, such as computer displays, television, printers, videotapes, DVDs, and audio speakers.

In addition, the present invention advantageously overcomes the expense and complexity of prior art non-linear editing systems by providing an inexpensive and easy to learn system for home use. Unlike conventional non-linear editing systems designed for professional use, the present invention automatically loads previously captured data onto the storyboard for editing. Similarly, the present invention automatically provides default transitions between each pair of clips on the storyboard. The present invention thus simplifies and facilitates the editing of home movies by enabling consumers to immediately manipulate captured clips, instead of undertaking complicated tasks to configure the storyboard as required by conventional non-linear editing systems. The present invention likewise provides novel methods of data handling to reduce bandwidth requirements and leverages the availability of low cost components to perform the functions of the costly, specialized components of the prior art. For example, the present invention enables the use of a YUV resolution of CCIR 601 in 4:2:2 format, instead of 4:4:4 format, to reduce data transfer bandwidth by about 10 Megabytes/sec without any image degradation or visual impact to a consumer.

The media editor of the present invention combines the functions of various software and hardware components into a novel architecture, which is integrated onto a low cost application specific integrated circuit (ASIC). Similarly, the media editor eliminates the need for costly, high performance, general purpose microprocessors of conventional PC based non-linear editing systems through the use of a SCRAM engine, which is capable of moving objects having varying degrees of transparency over each other at video rates of 30 frames/sec. The novel architecture of the present invention permits the use of inexpensive DRAM to create hypermedia effects using multiple video and analog channels simultaneously. In contrast to costly prior art VRAM buffers, the media editor of the present invention provides for priority based interleaved access to a DRAM based media buffer that delivers full video bandwidth. Additionally, the system accepts a wide variety of hypermedia data types and stores them in the same storage, enabling the mixing of audio, video, text, music and other data types using common mixing engines. Moreover, the system allows for the capture of multiple hypermedia channels with simultaneous playback and editing. Furthermore, because the hypermedia output is not dependent on the hypermedia input synchronization, hypermedia inputs may be removed, attached and switched on the fly, resulting in different hypermedia input synchronizations without any effect on the timing or quality of the hypermedia output. Lastly, audio is synchronized to video by reference to a master pixel clock, which is also used to prevent "tearing" and other distortions.

The invention may be embodied in other specific forms without departing from its spirit or essential characteristics. Thus, the described embodiments are, in all respects, merely illustrative and not restrictive. Moreover, the appended claims, rather than the foregoing description, serve to define the scope of the invention. These claims embrace within their scope all changes which come within their meaning and range of equivalency.

What is claimed is:

1. A media editor for non-linear editing of hypermedia, comprising:
   a video controller to receive a video portion of a hypermedia input;
   an input frame controller, in data communication with the video controller, to provide a plurality of video frames representing the video portion;
   a memory controller to receive the video frames from the input frame controller for storage in a memory, wherein the memory controller accesses the memory;
   an editing engine, in data communication with the memory controller, to receive and manipulate the video frames; and
   a playback engine including:
      at least one playback controller in communication with the memory controller to retrieve the video frames from the memory;
      an alpha playback controller in communication with the memory controller to retrieve an alpha frame from the memory; and
      a video ALU, in communication with the at least one playback controller and the alpha playback controller, to integrate the retrieved video frames with the retrieved alpha frame so as to form an output video portion of a hypermedia output.

2. The media editor of claim 1, wherein the editing engine manipulates the video frames so as to form a transition frame.

3. The media editor of claim 1, wherein the memory controller provides arbitrated access to the memory.

4. The media editor of claim 1, wherein the memory controller provides burst access to the memory.

5. The media editor of claim 1, wherein the memory controller interleaves the plurality of video frames into a plurality of banks for access.

6. The media editor of claim 1, wherein the memory comprises dynamic random access memory.

7. The media editor of claim 1, wherein the video portion comprises a YUV video signal.

8. The media editor of claim 1, wherein the at least one playback controller comprises:
   a first playback controller, wherein the plurality of video frames includes a first frame sequence and a second frame sequence, the first playback controller retrieving a first frame from the first frame sequence; and
   a second playback controller, the second playback controller retrieving a second frame from the second frame sequence.

9. The media editor of claim 8, wherein the editing engine forms a transition frame on a pixelated basis according to the following equation: Transition Frame pixel=[(First Frame pixel * Alpha Frame pixel)+Second Frame pixel * (1−Alpha Frame pixel)], where the alpha frame pixel is normalized to a value between zero and one inclusive.

10. An editing engine for manipulating hypermedia, comprising:
    a first transition controller to retrieve a first frame from a memory controller;
    a second transition controller to retrieve a second frame from the memory controller;
    an alpha transition controller to retrieve an alpha frame from the memory controller; and
    a video ALU to receive and integrate the first frame, the second frame and the alpha frame so as to form a transition frame.

11. The editing engine of claim 10, further comprising a frame controller to receive and transfer the transition frame to the memory controller for storage.

12. The editing engine of claim 11, further comprising a data buffer, wherein the frame controller accesses the data buffer.

13. The editing engine of claim 10, further comprising at least one data buffer in communication with the first transition controller, the second transition controller and the alpha transition controller, wherein the video ALU accesses the at least one data buffer.

14. The editing engine of claim 10, wherein the video ALU forms the transition frame on a pixelated basis according to the following equation: Transition Frame pixel=[(First Frame pixel * Alpha Frame pixel)+Second Frame pixel * (1−Alpha Frame pixel)], where the alpha frame pixel is normalized to a value between zero and one inclusive.

15. A media editor for non-linear editing of hypermedia, comprising:
    a video controller to receive a video portion of a hypermedia input;
    an input frame controller, in data communication with the video controller, to provide a plurality of video frames representing the video portion;
    a memory controller to receive the video frames from the input frame controller for storage in a memory, wherein the memory controller accesses the memory;
    an editing engine, in data communication with the memory controller, to receive and manipulate the video frames;
    an audio codec interface to receive an audio portion of the hypermedia input in response to a master pixel clock; and
    an audio mixer to manipulate the audio portion so as to form an output audio portion of a hypermedia output, wherein the output audio portion is transferred to the audio codec interface for synchronization with an output video portion of the hypermedia output in response to the master pixel clock.

16. A media editor for non-linear editing of hypermedia, comprising:
    a video controller to receive a video portion of a hypermedia input, wherein the video portion comprises a YUV video signal;
    a gamma corrector to receive the YUV video signal, the gamma corrector providing a gamma corrected YUV signal;
    an input frame controller, in data communication with the gamma corrector, to provide a plurality of video frames representing the video portion;
    a memory controller to receive the video frames from the input frame controller for storage in a memory, wherein the memory controller accesses the memory; and
    an editing engine, in communication with the memory controller, to receive and manipulate the video frames.

* * * * *